United States Patent
Finn et al.

(10) Patent No.: US 11,068,770 B2
(45) Date of Patent: **\*Jul. 20, 2021**

(54) CONNECTION BRIDGES FOR DUAL INTERFACE TRANSPONDER CHIP MODULES

(71) Applicants: David Finn, Tourmakeady (IE); Mustafa Lotya, Celbridge (IE)

(72) Inventors: David Finn, Tourmakeady (IE); Mustafa Lotya, Celbridge (IE)

(73) Assignee: Féinics AmaTech Teoranta Lower Churchfield, Tourmakeady (IE)

( \* ) Notice: Subject to any disclaimer, the term of this patent is extended or adjusted under 35 U.S.C. 154(b) by 68 days.

This patent is subject to a terminal disclaimer.

(21) Appl. No.: 16/267,387

(22) Filed: Feb. 5, 2019

(65) Prior Publication Data

US 2020/0050914 A1 Feb. 13, 2020

Related U.S. Application Data

(63) Continuation-in-part of application No. 16/247,531, filed on Jan. 14, 2019, now Pat. No. 10,839,282, and
(Continued)

(51) Int. Cl.
*G06K 19/06* (2006.01)
*G06K 19/077* (2006.01)
*H01Q 1/22* (2006.01)

(52) U.S. Cl.
CPC . *G06K 19/07722* (2013.01); *G06K 19/07756* (2013.01); *H01Q 1/2216* (2013.01); *H01Q 1/2283* (2013.01); *B32B 2425/00* (2013.01)

(58) Field of Classification Search
CPC ....... G06K 19/07722; G06K 19/07756; H01Q 1/2216; H01Q 1/2283
(Continued)

(56) References Cited

U.S. PATENT DOCUMENTS 6,259,035 B1 7/2001 Trüggelmann et al.
6,460,773 B1 10/2002 Kaiya et al.
(Continued)

FOREIGN PATENT DOCUMENTS

DE M9308049 2/1994

OTHER PUBLICATIONS

International Search Report and Written Opinion from PCT/EP2014/073072.

*Primary Examiner* — Karl D Frech
(74) *Attorney, Agent, or Firm* — Gerald E Linden

(57) ABSTRACT

Connection bridges (CBR) for dual-interface transponder chip modules (TCM) 200 may have an area which is substantially equal to or greater than an area of a contact pad (CP) of a contact pad array (CPA). A given connection bridge may be L-shaped and may comprise (i) a first portion disposed external to the contact pad array and extending parallel to the insertion direction, and (ii) a second portion extending from an end of the first portion perpendicular to the insertion direction to within the contact pad array (CPA) such as between C1 and C5. The connection bridge may extend around a corner of the contact pad array, may be large enough to accommodate wire bonding, and may be integral with a coupling frame (CF) extending around the contact pad array. The transponder chip modules may be integrated into a smart card (SC).

16 Claims, 10 Drawing Sheets

Related U.S. Application Data a continuation-in-part of application No. 15/969,816, filed on May 3, 2018, now Pat. No. 10,518,518, which is a continuation-in-part of application No. 15/939,281, filed on Mar. 29, 2018, now Pat. No. 10,733,494, which is a continuation-in-part of application No. 15/358,138, filed on Nov. 22, 2016, now Pat. No. 9,960,476, which is a continuation-in-part of application No. 15/072,356, filed on Mar. 17, 2016, now Pat. No. 9,836,684, which is a continuation-in-part of application No. 14/551,376, filed on Nov. 24, 2014, now Pat. No. 9,390,364, and a continuation-in-part of application No. 14/619,177, filed on Feb. 11, 2015, now abandoned, which is a continuation-in-part of application No. 14/523,993, filed on Oct. 27, 2014, now abandoned, said application No. 15/072,356 is a continuation-in-part of application No. 14/492,113, filed on Sep. 22, 2014, now Pat. No. 9,798,968, which is a continuation-in-part of application No. 14/465,815, filed on Aug. 21, 2014, now Pat. No. 9,475,086.

(60) Provisional application No. 62/080,332, filed on Nov. 16, 2014, provisional application No. 62/061,689, filed on Oct. 8, 2014, provisional application No. 62/044,394, filed on Sep. 1, 2014, provisional application No. 62/039,562, filed on Aug. 20, 2014, provisional application No. 62/021,112, filed on Jul. 5, 2014, provisional application No. 61/950,020, filed on Mar. 8, 2014.

(58) Field of Classification Search
USPC .................................................. 235/492, 487
See application file for complete search history.

(56) References Cited

U.S. PATENT DOCUMENTS

| | | | |
|---|---|---|---|
| 6,568,600 | B1 | 5/2003 | Carpier et al. |
| 6,712,279 | B2 | 3/2004 | Muehlberger et al. |
| 9,489,613 | B2 * | 11/2016 | Finn .................. G06K 19/07783 |
| 9,812,782 | B2 * | 11/2017 | Finn ........................ B23K 26/40 |
| 9,960,476 | B2 * | 5/2018 | Finn ...................... H01Q 1/2225 |
| 2005/0212690 | A1 | 9/2005 | Nishikawa |
| 2008/0017980 | A1 | 1/2008 | Scheucher |
| 2008/0245879 | A1 | 10/2008 | Artigue et al. |
| 2008/0308641 | A1 | 12/2008 | Finn |
| 2013/0146670 | A1 | 6/2013 | Grieshofer et al. |
| 2014/0104133 | A1 | 4/2014 | Finn et al. |
| 2014/0361086 | A1 | 12/2014 | Finn et al. |

* cited by examiner

Dual Interface (DI) Smart Card, and Readers

ISO 7816

8-pad contact pattern insertion direction 6-pad contact pattern insertion direction connection bridge(s) and logo/branding area(s) external to contact pad area transponder chip module (TCM) with coupling frame (CF)

coupling frame (CF) as connection bridge (CBR)

CONNECTION BRIDGES FOR DUAL INTERFACE TRANSPONDER CHIP MODULES

CROSS-REFERENCE TO RELATED APPLICATIONS

This application claims filing date benefit (priority), as a nonprovisional or continuation-in-part from the following US provisional and nonprovisional patent applications, all of which are incorporated by reference herein:

This is a continuation-in-part of Ser. No. 16/247,531 filed 14 Jan. 2019

This is a continuation-in-part of Ser. No. 15/969,816 filed 3 May 2018

Ser. No. 15/969,816 is a continuation-in-part of Ser. No. 15/939,281 filed 29 Mar. 2018

Ser. No. 15/939,281 is continuation-in-part of Ser. No. 15/358,138 filed 22 Nov. 2016

Ser. No. 15/358,138 is a continuation-in-part of Ser. No. 15/072,356 filed 17 Mar. 2016

Ser. No. 15/072,356 is a continuation-in-part of Ser. No. 14/619,177 filed 11 Feb. 2015

Ser. No. 14/619,177 is a continuation-in-part of Ser. No. 14/523,993 filed 27 Oct. 2014

Ser. No. 14/619,177 is a non-provisional of 62/039,562 filed 20 Aug. 2014

Ser. No. 14/619,177 is a non-provisional of 62/021,112 filed 5 Jul. 2014

Ser. No. 14/619,177 is a non-provisional of 61/950,020 filed 8 Mar. 2014

Ser. No. 15/072,356 is a continuation-in-part of Ser. No. 14/551,376 filed 24 Nov. 2014

Ser. No. 14/551,376 is a nonprovisional of 62/080,332 filed 16 Nov. 2014

Ser. No. 14/551,376 is a nonprovisional of 62/061,689 filed 8 Oct. 2014

Ser. No. 14/551,376 is a nonprovisional of 62/044,394 filed 1 Sep. 2014

Ser. No. 15/072,356 is a continuation-in-part of Ser. No. 14/492,113 filed 22 Sep. 2014

Ser. No. 14/492,113 is a continuation-in-part of Ser. No. 14/465,815 filed 21 Aug. 2014

TECHNICAL FIELD

The disclosure relates to RFID devices including "secure documents" or "RFID tags" such as electronic passports, electronic ID cards and smartcards (or payment cards, electronic tickets, and the like), or chip cards having RFID (radio frequency identification) chips or chip modules (CM) capable of operating in a "contactless" mode (ISO 14443 or NFC/ISO 15693) and, more particularly, to dual interface (DI) smartcards and secure documents which can also operate in contact mode (ISO 7816-2).

The techniques disclosed herein may also be applicable to RFID devices including "non-secure smartcards" and RFID tags such as contactless devices in the form of keycards, building access cards, security badges, access control cards, asset tags, event passes, hotel keycards, wearable devices, tokens, small form factor tags, data carriers and the like operating in close proximity with a contactless reader.

BACKGROUND

A dual interface (DI or DIF) smartcard (or smart card SC), as an example of RFID device, may generally comprise:

an antenna module (AM),
a card body (CB) or inlay having layers of plastic or metal, or combinations thereof, and
a booster antenna (BA).

The antenna module (AM), which may be referred to as a transponder chip module (TCM) or RFID module may generally comprise:

a module tape (MT) or chip carrier tape (CCT), more generally, simply a "substrate";

a contact pad array (CPA) comprising 6 or 8 contact pads (CP, or "ISO pads") disposed on a "face up side" or "contact side" (or surface) of the module tape (MT), for interfacing with a contact reader in a contact mode (ISO 7816);

an RFID chip (CM, IC) which may be a bare, unpackaged silicon die or a chip module (a die with leadframe, interposer, carrier or the like) disposed on a "face down side" or "bond side" or "chip side" (or surface) of the module tape (MT);

a module antenna (MA) or antenna structure (AS) disposed on the face down side of the module tape (MT) for implementing a contactless interface, such as ISO 14443 and NFC/ISO 15693 with a contactless reader or other RFID device.

The antenna module AM (or transponder chip module TCM) may be generally rectangular, having four sides, and measuring approximately 8.2 mm×10.8 mm for a 6 contact module and 11.8 mm×13.0 mm for an 8 contact module. Alternatively, the transponder chip module (TCM) may be round, elliptical, or other non-rectangular shape. When operating in a contactless mode, the transponder chip module (TCM) may be powered by RF from an external RFID reader, and may also communicate by RF with the external RFID reader.

A module antenna (MA) connected to an RFID chip (CM) may be referred to as a "transponder". Generally, such a transponder is a "passive" transponder which does not have its own power source (e.g., battery), but rather which harvests power from an external reader (interrogator).

The module antenna (MA) may be wire-wound, or etched, for example:

The module antenna (MA) may comprise several turns of wire, such as 50 micron diameter insulated wire. Reference may be made to U.S. Pat. No. 6,378,774 (2002, Toppan), for example FIGS. 12A, B thereof.

The module antenna (MA) may be a chemically-etched planar antenna (PA) structure. Reference may be made to U.S. Pat. No. 8,100,337 (2012, SPS), for example FIG. 3 thereof.

The module antenna (MA) may comprise a laser-etched planar antenna (PA) structure (LES). Reference may be made to U.S. Ser. No. 14/281,876 filed 19 May 2014 (20140284386, 25 Sep. 2014).

A planar antenna (PA) structure, or simply "planar antenna (PA)", whether chemically-etched (CES) or laser-etched (LES), may comprise a long conductive trace or track having two ends, in the form of a spiral encircling the RFID chip on the face-down side of the module tape. This will result in a number of tracks (actually, one long track), separated by spaces. The track width may be approximately 100 μm. Generally, with laser etching, the spacing between tracks can be made smaller (such as 25 μm) than with chemical etching (such as 100 μm).

The (two) ends of the module antenna (MA) may be connected, either directly or indirectly to corresponding terminals (LA, LB) of the RFID chip (IC, CM). For example, one or both ends of the module antenna (MA) may be connected to bond pads or interconnect traces on the face-down side of the module tape (MT), to which the terminals of the RFID chip (IC, CM) may also be connected.

Alternatively, one or both ends of the module antenna (MA) may be connected via electrically conductive structures, which may be referred to as "contact bridges" or "connection bridges", disposed on the face-up side of the module tape (MT), and which may be formed from the same conductive layer as the contact pads (CP).

US 20130146670 (Jun. 13, 2013, Grieshofer et al; "Infineon") discloses CHIP CARD CONTACT ARRAY ARRANGEMENT. In various embodiments, a chip card contact array arrangement is provided, having a carrier, a plurality of contact arrays which are arranged on a first side of the carrier, an electrically conductive structure which is arranged on a second side of the carrier, which is arranged opposite the first side of the carrier, a first plated-through hole and a second plated-through hole, wherein the first plated-through hole is coupled to the electrically conductive structure, a connecting structure which is arranged on the first side of the carrier, wherein the connecting structure connects the first plated-through hole to the second plated-through hole, the connecting structure having a longitudinal extent which runs parallel to a direction in which a contact-connection device on a reading device is moved relative to the plurality of contacts.

Some problems with Infineon's connecting structures, which they refer to as "contact bridges", and which may generally be referred to herein as "connection bridges", is that Infineon's contact bridges are long and skinny, fragile, do not have much surface area, and are disposed (routed) in a confined area of the contact pad array (CPA), such as between the C6 and C7 contact pads (CP).

SUMMARY

It is a general object of the invention to provide improved techniques for implementing connection bridges (CBR) or contact bridges (Infineon terminology) in dual-interface antenna modules (AM) or transponder chip modules (TCM).

The connection bridges (CBR) disclosed herein may be more robust, versatile and durable than Infineon's contact bridges, which may facilitate implementing features not otherwise available with Infineon's contact bridges.

According to the invention, generally, connection bridges (CBR) for dual-interface transponder chip modules (TCM) may have an area which is at least a significant fraction of, including greater than, an area of a contact pad (CP) of a contact pad array (CPA). A given connection bridge may be L-shaped and may comprise (i) a first portion disposed external to the contact pad array and extending parallel to the insertion direction, and (ii) a second portion extending from an end of the first portion perpendicular to the insertion direction to within the contact pad array (CPA) such as between C1 and C5. The connection bridge may extend around a corner of the contact pad array, may be large enough to accommodate wire bonding, and may be integral with a coupling frame (CF) extending around the contact pad array. The transponder chip modules may be integrated into a smart card (SC).

According to some embodiments (examples) of the invention, a transponder chip module (TCM) may comprise a substrate (MT, CCT) having two surfaces; contact pads (CP) disposed in a contact pad array (CPA) on a first surface of the substrate; and a connection bridge (CBR) disposed on the first surface of the substrate for interconnecting components on a second surface of the substrate; wherein an insertion direction is defined for the transponder chip module; and may be characterized by: the connection bridge (CBR) has an area which may be at least a substantial fraction such as 25% of, including substantially equal to or greater than an area of a contact pad (CP) in the contact pad array (CPA). The components may comprise a module antenna (MA); and an RFID chip (CM, IC). An RFID device such as a smart card (SC) may comprise such a transponder chip module (TCM).

The connection bridge may be L-shaped and may comprise: a first portion of the connection bridge is external to the contact pad array and extends parallel to the insertion direction; and a second portion of the connection bridge extends perpendicular to the insertion direction to within the contact pad array. At least a portion of the connection bridge may have an area large enough to support wire bonding. The connection bridge may be able to effect interconnections without requiring plated-through holes. The connection bridge may be large enough to support a logo.

The connection bridge (CBR) may extend around a corner of the contact pad array (CPA). The connection bridge (CBR) may be disposed entirely external to the contact pad array. The connection bridge (CBR) may be disposed entirely internal to the contact pad array.

A second connection bridge (CBR-2) may be disposed on the first surface of the substrate. Both connection bridges may extend parallel to the insertion direction.

An open-loop coupling frame (CF) may extend around the contact pad array (CPA). The coupling frame (CF) may be integral with the connection bridge (CBR).

According to some embodiments (examples) of the invention, a transponder chip module (TCM) may comprise: a substrate (MT, CCT) having two surfaces; contact pads (CP) disposed in a contact pad array (CPA) on a first surface of the substrate; and a connection bridge (CBR) disposed on the first surface of the substrate for interconnecting components on a second surface of the substrate; wherein an insertion direction is defined for the transponder chip module; and may be characterized by: a first portion of the connection bridge is external to the contact pad array, and extends parallel to the insertion direction; and a second portion of the connection bridge extends perpendicular to the insertion direction to within the contact pad array.

According to some embodiments (examples) of the invention, a transponder chip module (TCM) may comprise: a substrate (MT, CCT) having a first surface and a second surface; a contact pad array (CPA) disposed on the first surface of the substrate; and a coupling frame (CF) disposed on the first surface of the substrate, around the contact pad array; wherein the coupling frame serves as a connection bridge (CBR) for interconnecting components disposed on the second surface of the substrate. The substrate may be a module tape. The connected components may comprise a module antenna (MA) and an RFID chip (CM, IC). The coupling frame may extend to an interior of the contact pad array (CPA). The coupling frame may extend between two contact pads of the contact pad array.

An insertion direction may be defined for the transponder chip module. A first portion of the connection bridge may be external to the contact pad array and may extend parallel to the insertion direction; and a second portion of the connection bridge may extend perpendicular to the insertion direction to within the contact pad array.

The connection bridge can effect interconnections without requiring plated-through holes.

The connection bridge may be large enough to support a logo. The connection bridge may be large enough to accommodate wire bonding The connection bridge may extend around a corner of the contact pad array. The connection bridge may be disposed entirely external to the contact pad array. The connection bridge may be disposed at least partially internal to the contact pad array.

A second connection bridge may be disposed on the first surface of the substrate. An insertion direction may be defined for the transponder chip module; and both connection bridges extend parallel to the insertion direction.

A smart card may incorporate the transponder chip module with integrated coupling frame/connection bridge.

According to some embodiments (examples) of the invention, a method of connecting components disposed on a bottom surface of a substrate for a transponder chip module (TCM), the transponder chip module having a contact pad array on a front surface thereof, may comprising: providing a coupling frame on the front surface of the substrate; and connecting the components through the substrate, via the coupling frame, to one another. The coupling frame may extend around the contact pad array. A portion of the coupling frame may extend between contacts of the contact pad array. The transponder chip module may be incorporated into a smart card.

In their various embodiments, the invention(s) described herein may relate to industrial and commercial industries, such RFID applications, payment smartcards, electronic passports, identity cards, access control cards, wearable devices the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGS.). The figures may generally be in the form of diagrams. Some elements in the figures may be stylized, simplified or exaggerated, others may be omitted, for illustrative clarity.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Some elements may be referred to with letters ("CM", "MT", "TCM", "CBR", "CB", "MA", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and may collectively (all of them at once) referred to simply by the numeral ("310").

Figure 1:
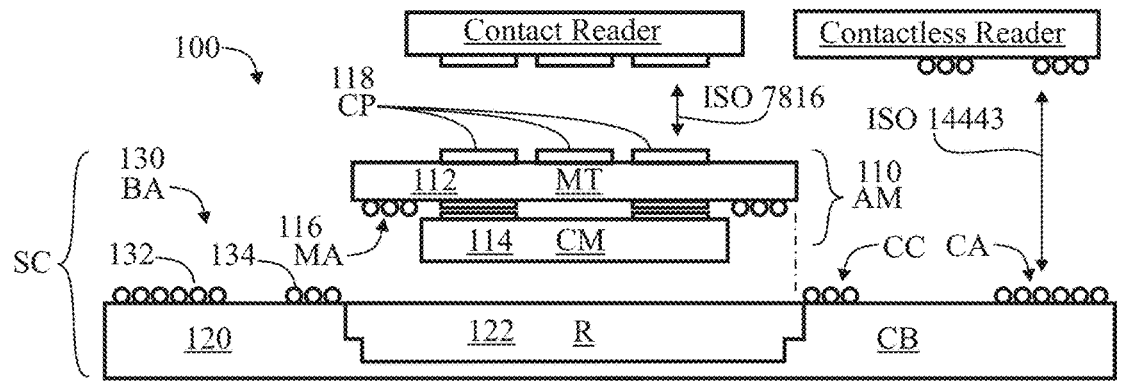

FIG. 1 is a diagram, in cross-section, of a dual-interface smart card (SC) and readers.

Figure 1A:
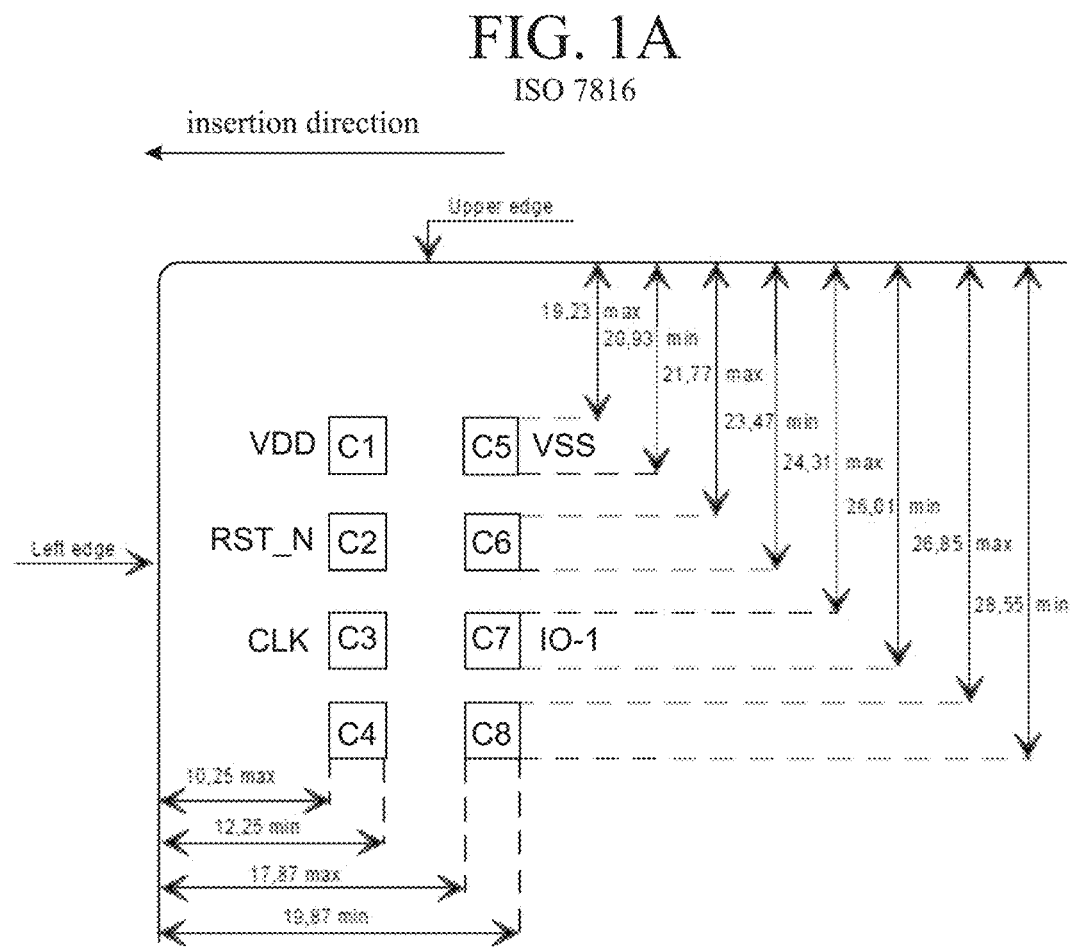

FIG. 1A is a diagram showing the ISO-7816 specification for contact pad layout.

Figure 1B:
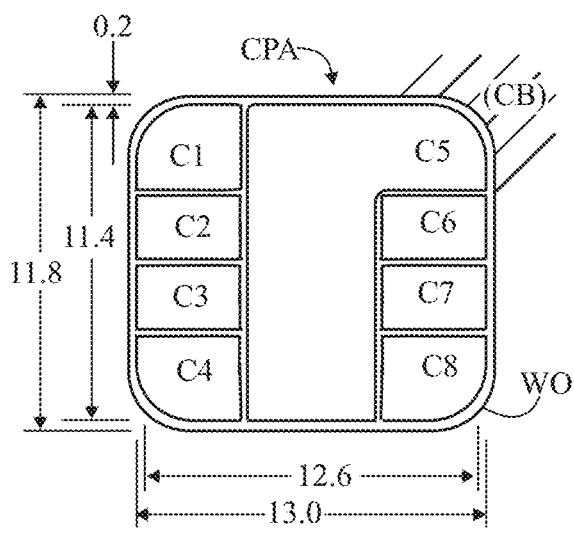

FIG. 1B is a diagram of an 8-pad pattern for ISO 7816 contacts.

Figure 1C:
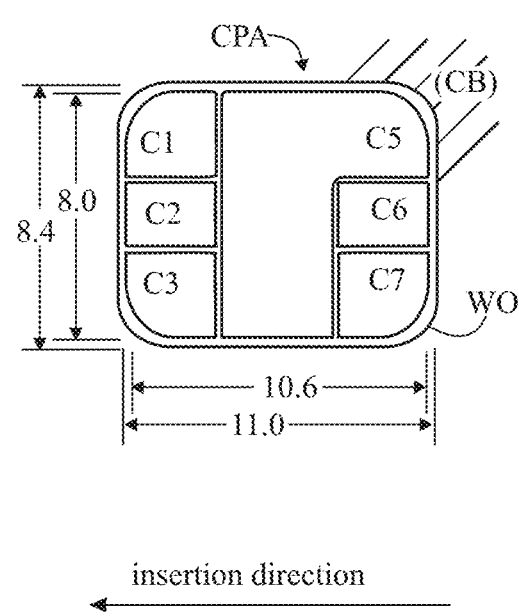

FIG. 1C is a diagram of a 6-pad pattern for ISO 7816 contacts.

Figure 2A:
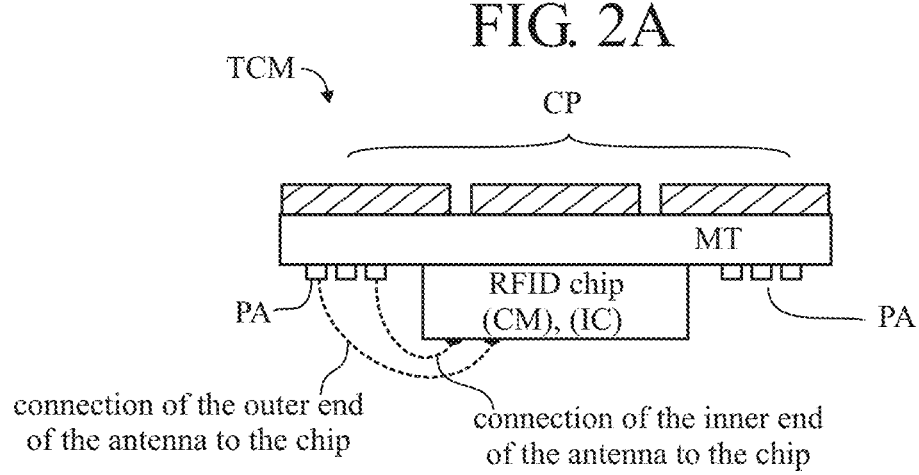

FIG. 2A is a diagram (cross-sectional view) of a transponder chip module (TCM).

Figure 2B:
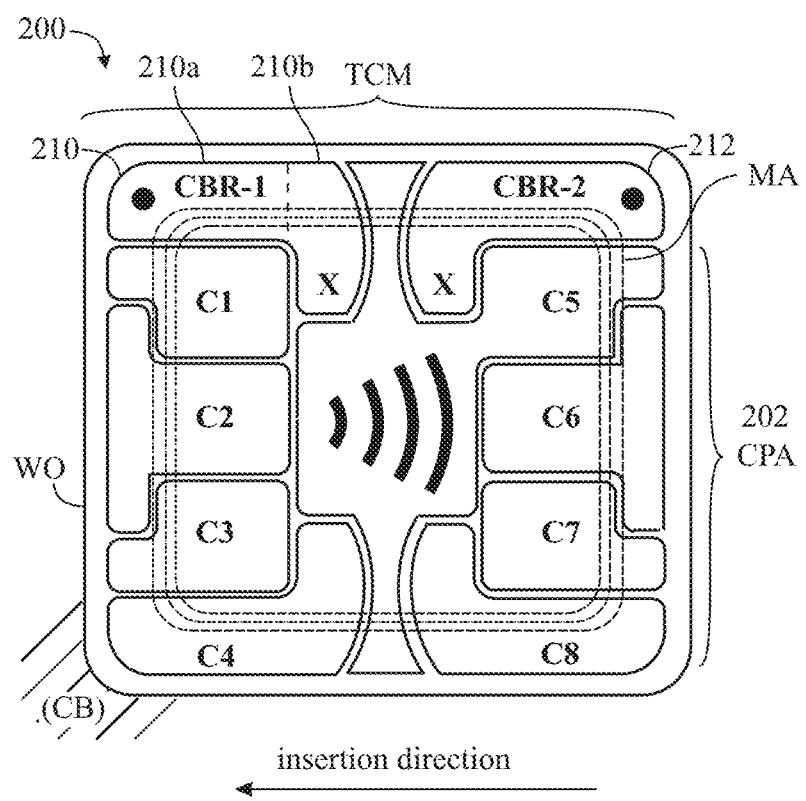

FIG. 2B is a diagram (plan view) of a contact side of a dual-interface antenna module (AM) or transponder chip module (TCM).

Figure 3:
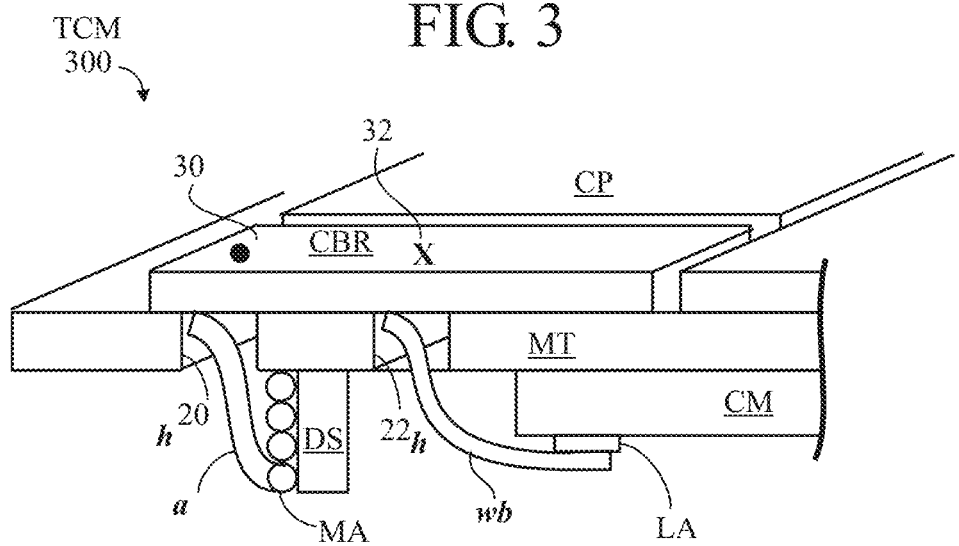

FIG. 3 is a diagram (partial perspective view) of a module tape (MT) for an antenna module (AM) having a connection bridge (CBR).

FIGS. 3A, 3B, 3C, 3D and 3E are diagram (plan view) showing contact pads C1-C6 of an antenna module (AM), and connection bridges (CBR).

Figure 3A:
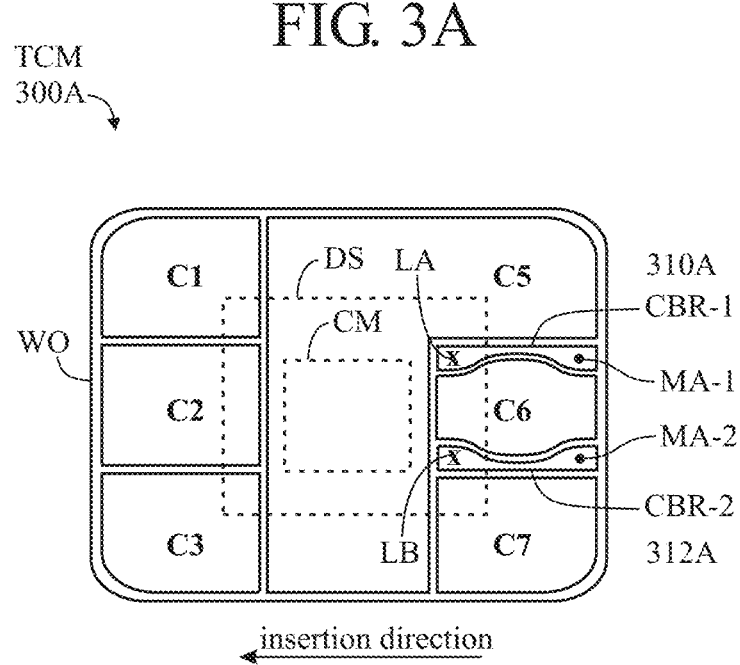
Figure 3B:
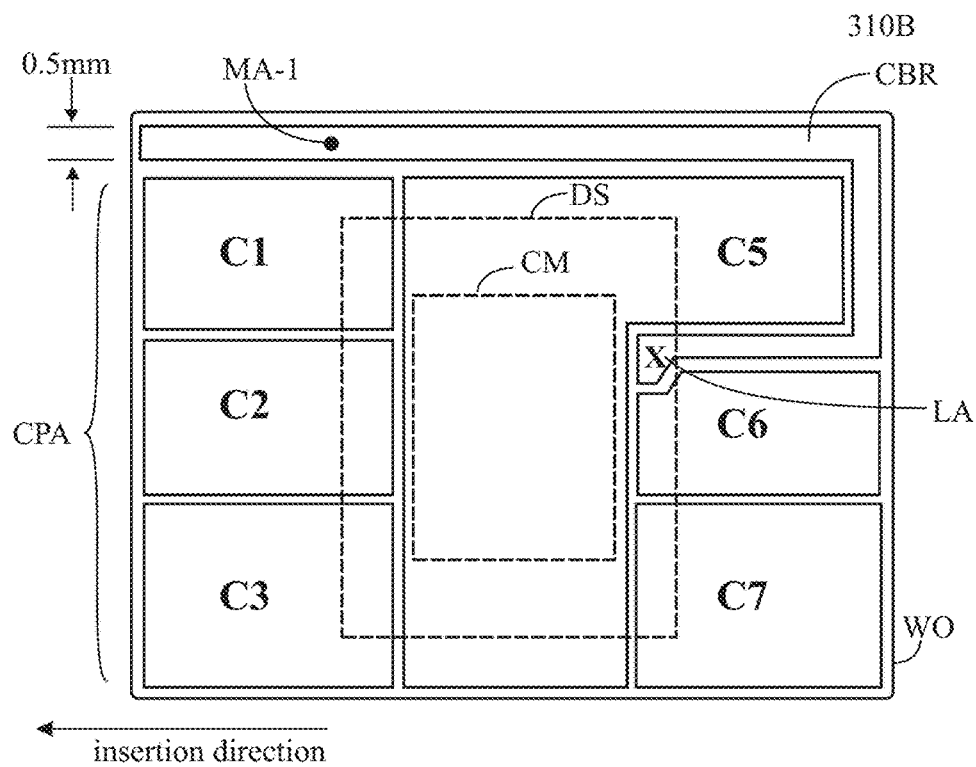
Figure 3C:
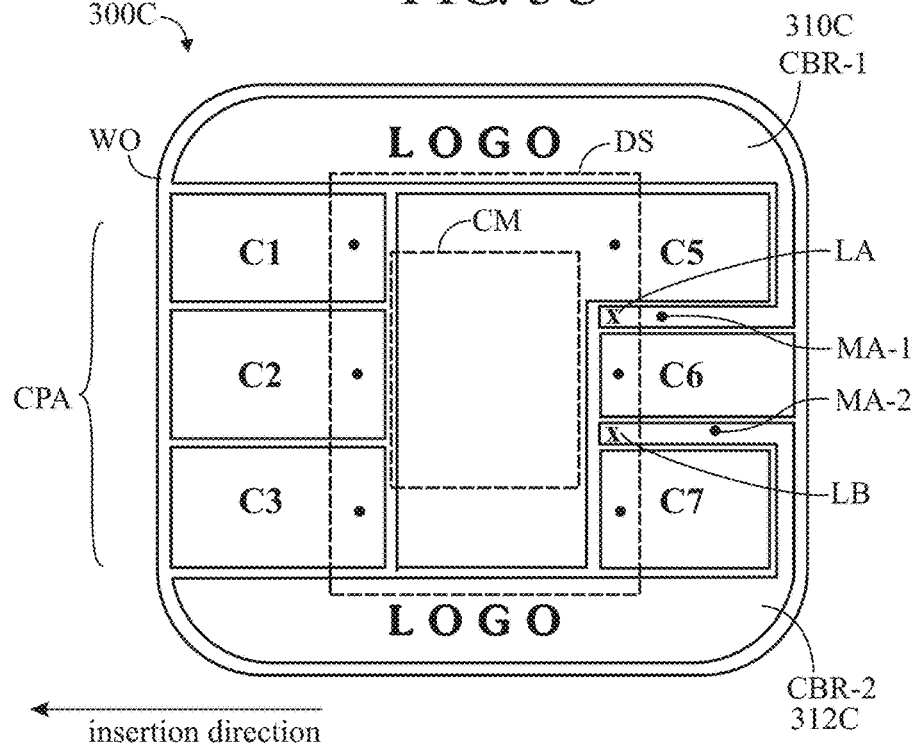
Figure 3D:
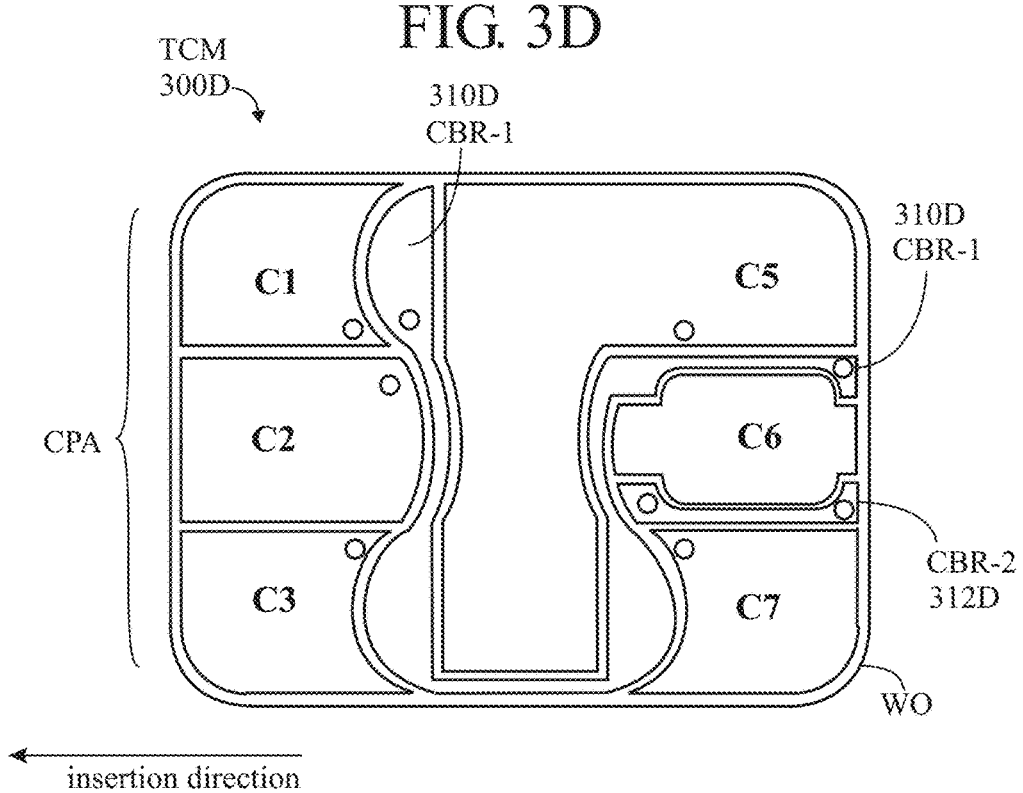
Figure 3E:
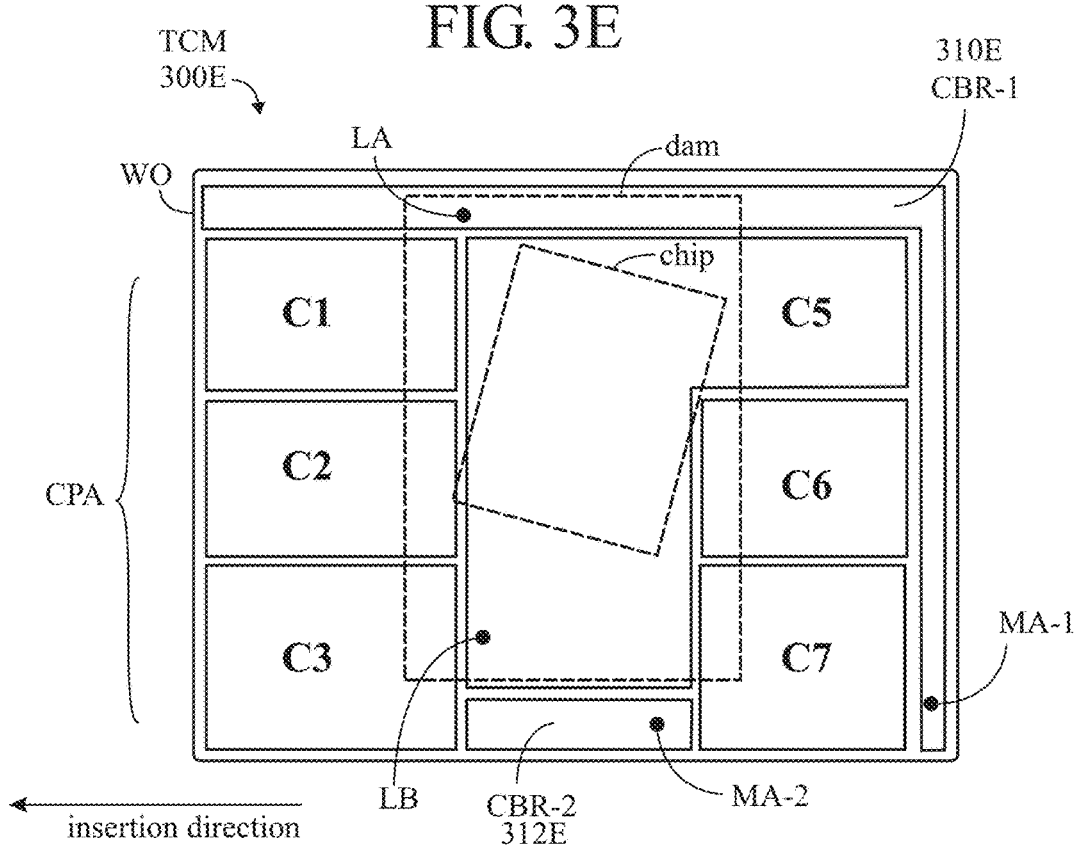
Figure 3F:
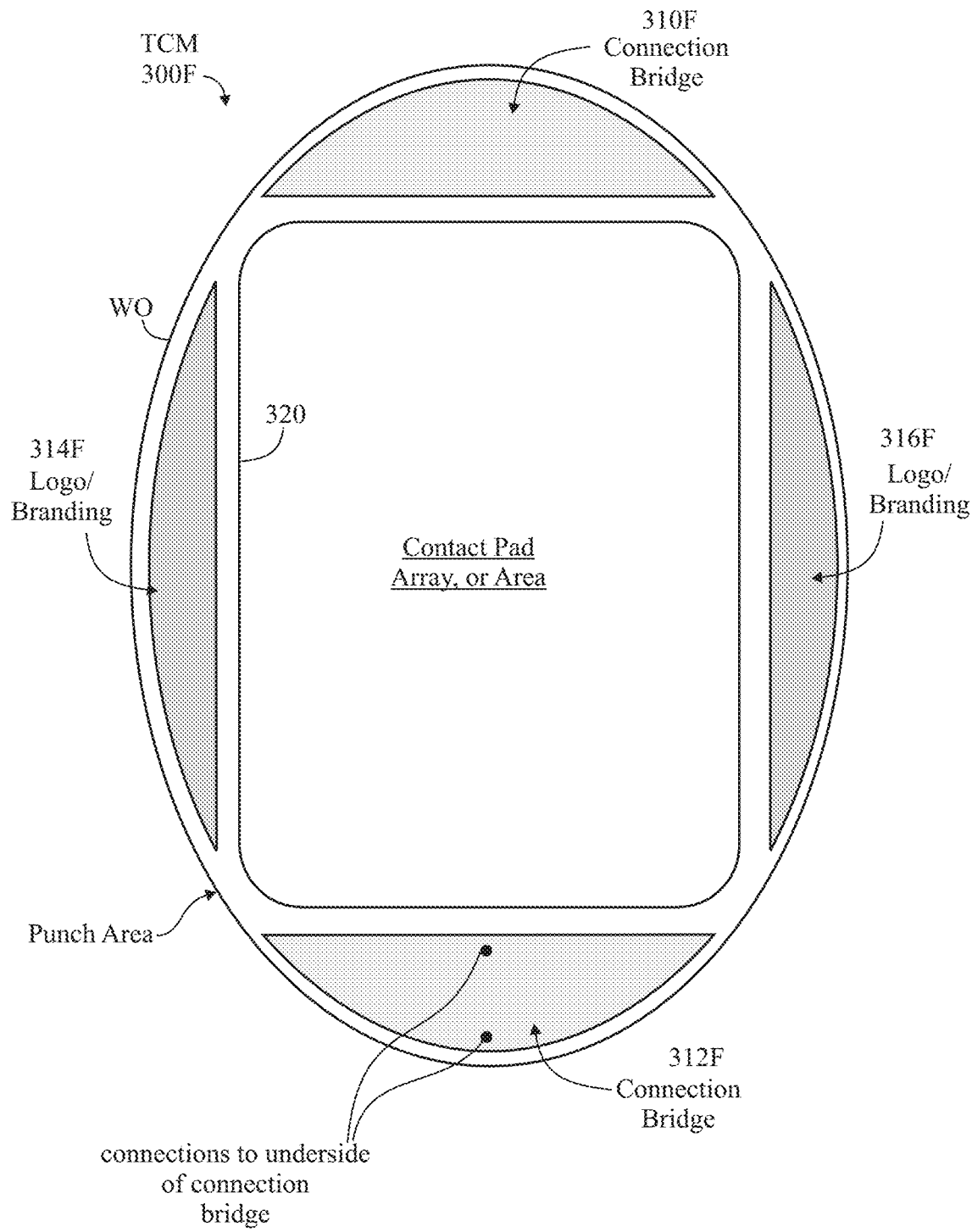

FIG. 3F is a diagram (plan view) showing a contact pad area of an antenna module (AM) and connection bridges (CBR).

Figure 4:
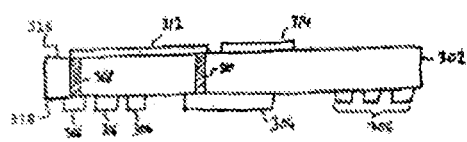
Figure 4A:
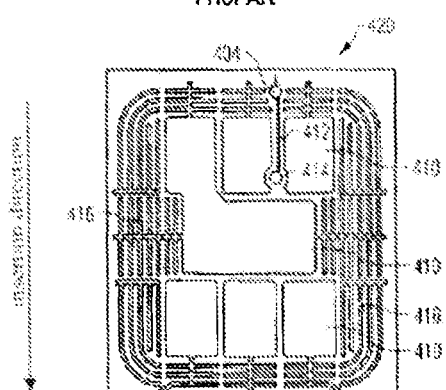
Figure 4B:
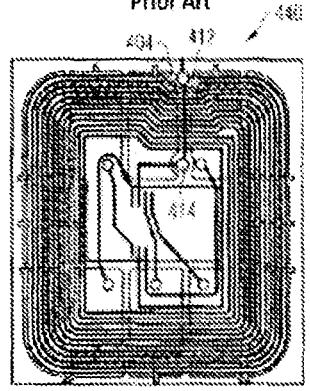

FIGS. 4, 4A and 4B are prior art views showing a Chip Card Contact Array Arrangement as disclosed in US 20130146670 ("Infineon").

Figure 5A:
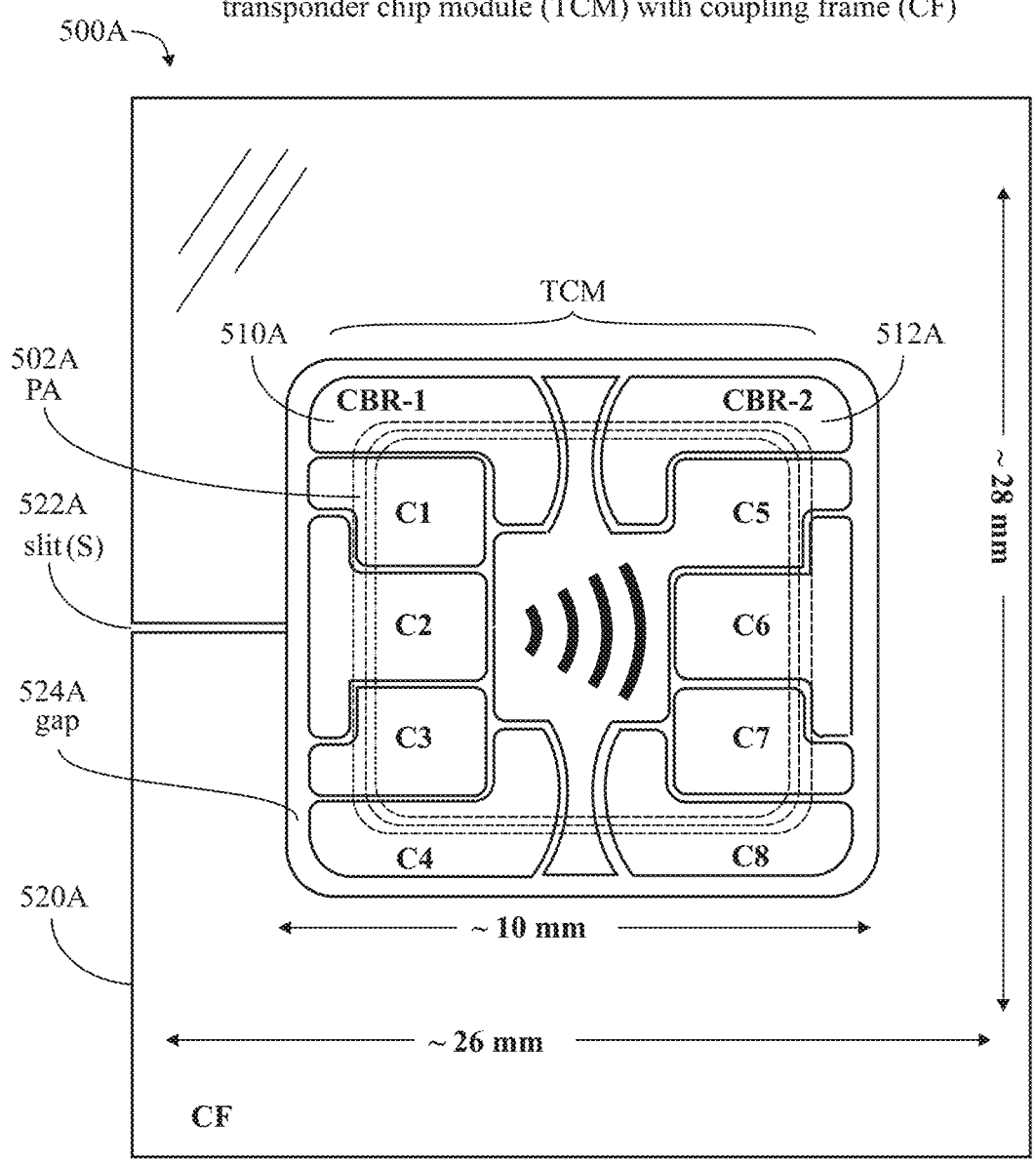

FIG. 5A is a diagram (plan view) of a transponder chip module (TCM) which has a coupling frame (CF) incorporated on its module tape (MT) or chip carrier tape (CCT).

Figure 5B:
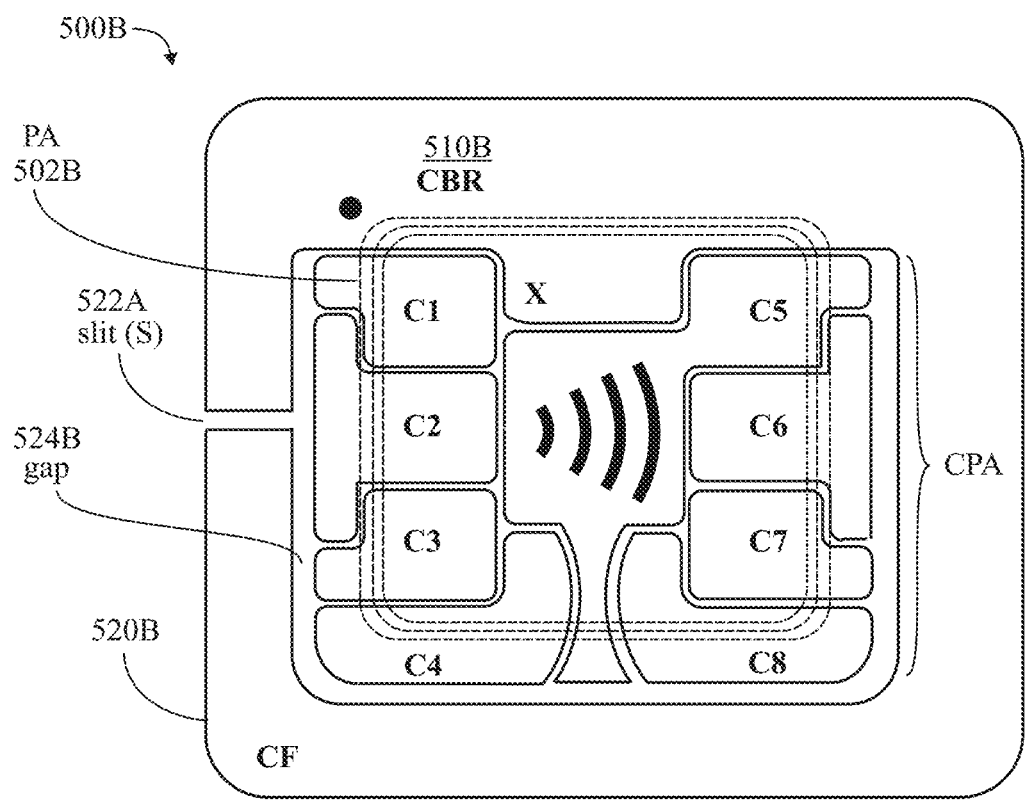

FIG. 5B is a diagram (plan view) of a transponder chip module (TCM) which has a coupling frame (CF) doubling as a connection bridge (CBR) incorporated on its module tape (MT) or chip carrier tape (CCT).

DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

In the main hereinafter, RFID cards, electronic tags and secure documents in the form of pure contactless cards, dual interface cards, phone tags, electronic passports, national identity cards and electronic driver licenses may be discussed as exemplary of various features and embodiments of the invention(s) disclosed herein. As will be evident, many features and embodiments may be applicable to (readily incorporated in) other forms of smart cards, such as EMV payment cards, metal composite cards, metal hybrid cards, metal foil cards, access control cards and secure credential documents. As used herein, any one of the terms "transponder", "tag", "smart card", "data carrier", "wearable device" and the like, may be interpreted to refer to any other of the devices similar thereto which operate under ISO 14443 or similar RFID standard. The following standards are incorporated in their entirety by reference herein:

- ISO/IEC 14443 (Identification cards—Contactless integrated circuit cards—Proximity cards) is an international standard that defines proximity cards used for identification, and the transmission protocols for communicating with it.
- ISO/IEC 15693 is an ISO standard for vicinity cards, i.e. cards which can be read from a greater distance as compared to proximity cards.
- ISO/IEC 7816 is an international standard related to electronic identification cards with contacts, especially smart cards.
- EMV standards define the interaction at the physical, electrical, data and application levels between IC cards and IC card processing devices for financial transactions. There are standards based on ISO/IEC 7816 for contact cards, and standards based on ISO/IEC 14443 for contactless cards.

A typical a transponder chip module (TCM) described herein may comprise
(i) a substrate, such as an epoxy-glass substrate, which may be referred to as a module tape (MT) or a chip carrier tape (CCT) and which may function as an inlay substrate,
(ii) a planar antenna (PA) structure, or simply antenna structure (AS), which may be a laser-etched antenna structure (LES) or a chemically-etched antenna structure (CES), disposed on the substrate and connected with an RFID chip (CM, IC) disposed on the substrate, When "chip module" is referred to herein, it should be taken to include "chip", and vice versa, unless explicitly otherwise stated. When "transponder chip module" (TCM) is referred to herein, it should be taken to include "antenna module" (AM), and vice versa, unless explicitly otherwise stated. The transponder chip module (TCM) may also be referred to as a "transponder IC module". Throughout the various embodiments disclosed herein, unless specifically noted otherwise (in other words, unless excluded), the element referred to as "CM" will most appropriately be a bare integrated circuit (IC) die (or RFID chip), rather than a chip module (a die with a carrier). Some figures may present examples that are specifically "chip modules" having IC chips (such as a "CM") mounted and connected to substrates. A "chip module" (die and carrier) with a planar (etched) antenna structure (PA, AS, LES, CES) and connected thereto may be referred to as a transponder chip module (TCM).

When "inlay substrate" is referred to herein, it should be taken to include "card body", and vice versa, as well as any other substrate for a secure document, unless explicitly otherwise stated.

When "module tape" is referred to herein, it generally refers to a module tape (MT) or chip carrier tape (CCT) comprising an epoxy-glass substrate having metallization (typically a copper layer) on one or both sides thereof. The module tape (MT, substrate) may comprise insulating (electrically non-conductive) materials other than epoxy-glass.

Generally, any dimensions set forth herein are approximate, and materials set forth herein are intended to be exemplary. Conventional abbreviations such as "cm" for centimeter", "mm" for millimeter, "µm" for micron, and "nm" for nanometer may be used.

FIG. 1 illustrates a smart card SC (100) in cross-section, along with a contact reader and a contactless reader. An antenna module (AM, or transponder chip module TCM) 110 may comprise a module tape (MT) 112, an RFID chip (CM) 114 disposed on one side (face-down) of the module tape MT along with a module antenna (MA) 116 and contact pads (CP) 118 disposed on the other (face-up) side of the module tape (MT) for interfacing with an external contact reader. The card body (CB) 120 comprises a substrate which may have a recess (R) 122 extending into one side thereof for receiving the antenna module (AM). (The recess R may be stepped—such as wider at the surface of the card body (CB)—to accommodate the profile of the antenna module AM.) The booster antenna (BA) 130 may comprise turns (or traces) of wire (or other conductor) embedded in (or disposed on) the card body CB, and may comprise a number of components such as (i) a card antenna (CA) component 132 and (ii) a coupler coil (CC) component 134. It may be noted that, as a result of the recess R being stepped, a portion of the card body (CB) may extend under a portion of the antenna module (AM), more particularly under the module antenna (MA).

FIG. 1A shows the ISO-7816 specification for a contact pad array (CPA). Eight contact pads C1-C8 are shown, The contact pads C1-C8 are located on the front surface of a smartcard. The dimensions are referenced to the left and upper edges of the front surface of the card. For a 6-pad layout, the contact pads C4 and C8 may be omitted. The signal assignments for the contact pads are,

| | |
|---|---|
| C1 | VDD |
| C2 | RST_N |
| C3 | CLK |
| C4 | not used |
| C5 | VSS |
| C6 | not used |
| C7 | IO 1 |
| C8 | not used |

The arrow in FIG. 1A ("insertion direction") indicates the direction that a smart card would be inserted into a reader, with contact pads C1, C2, C3 and C4 entering the reader first, followed by contact pads C5, C6, C7 and C8. (A 6 pad module does not have contact pads C4 and C8.) The "insertion direction" (or "card insertion direction"), as used herein, may be defined as a direction parallel to a line drawn from C1 to C5, or from C2 to C6, or from C3 to C7 or from C4 to C8.

The contact pads C1, C2, C3 and C4 are arranged in a row that is perpendicular to the insertion direction. The contact pads C5, C6, C7 and C8 are arranged in a row that is perpendicular to the insertion direction. The row of contact pads C5, C6, C7 and C8 is parallel to the row of contact pads C1, C2, C3 and C4, and offset therefrom by up to 5.62 mm (17.87 mm-12.25 mm) in the insertion direction. When a smart card (e.g.) is inserted into a reader, typically the contact pads C1, C2, C3 and C4 may first enter the reader, followed (with further insertion of the smart card into the reader) by the contact pads C5, C6, C7 and C8 (it being understood that a 6 pad array may not have C4 and C8).

From the dimensions set forth in FIG. 1A, it is apparent that the minimum size for an ISO 7816 contact pad array (CPA) would be:

9.62 mm (19.87 mm-10.25 mm) in the insertion direction
9.32 mm (28.55 mm-19.23 mm) perpendicular to the insertion direction FIG. 1B is a diagram of an exemplary contact pad array (CPA) comprising an 8-pad pattern for ISO 7816 contacts, and illustrates that an 8-pad layout may measure approximately 11.4 mm×12.6 mm.

FIG. 1C is a diagram of an exemplary contact pad array (CPA) comprising an exemplary 6-pad pattern for ISO 7816 contacts, and illustrates that a 6-pad layout may measure approximately 8.0 mm×10.6 mm.

The rectangular border extending around the various contact pad arrays shown herein (including around the contact pad array and the connection bridges) may represent an opening (WO) in a card body (CB, or inlay substrate) for the transponder chip module (TCM).

In FIG. 1B, with a 0.2 mm space around the contact pad array (CPA), the size of the opening (WO) may be approximately 11.8 mm×13.0 mm In FIG. 1C, with a 0.2 mm space around the contact pad array (CPA), the size of the opening (WO) may be approximately 8.4 mm×11.0 mm.

The overall arrangement or totality of six or eight contact pads (CP, or contacts, or ISO pads) constitutes what is referred to herein as a contact pad array (CPA), which is an array of individual contact pads (CP), or "ISO pads"). (In US 20130146670, Infineon refers to individual pads as "contact arrays" and the totality of contact pads as "contact pad arrangement".)

As is evident from FIGS. 1A, 1B and 1C, there is a relatively large space available in the center of the contact pad array (CPA) which may be devoid of contact pads (CP). From the dimensions set forth in FIG. 1A, it is evident that the central area of the contact pad array (CPA) may measure up to approximately 5.6 mm×9.3 mm ((17.87 mm-12.25 mm)×28.55 mm-19.23 mm). This central area of the contact pad array (CPA) may have the same copper foil on it as that which is used to form the contact pads (CP), and the C5 (ground, earth) contact pad may be formed so as to extend into the central area and be contiguous with metal in the central area.

It may be noted, from ISO 7816 (refer to FIG. 1A), that some of the contact pads (e.g., C1-C4, or C5-C8), namely those that are arranged in a row perpendicular to the direction of insertion, are narrowly-spaced (closely spaced), having a maximum space available between adjacent pads of approximately 1.7 mm. In contrast thereto, other ones of the contact pads, for example C1 and C5 (or C2 and C6, or C3 and C7, or C4 and C8), namely those arranged parallel to the direction of insertion, are widely-spaced, having a maximum space available between adjacent pads of approximately 5.6 mm (17.87 mm-12.25 mm). The importance of distinguishing between narrowly-spaced (adjacent) contact pads and widely-spaced (adjacent) contact pads will become evident when describing connection bridges (CBR), below.

Another concept which will be discussed hereinbelow is distinguishing between an area "within" (or internal to) the contact pad array (CPA) and an area which is "without" (or external to) the contact pad array (CPA). As is evident from FIGS. 1A, 1B and 1C, the contact pads (C1-C6, C1-C8) and the area in the center of the array (which may be devoid of contact pads, or used to extend C5) are "within" the contact pad array (CPA). The line (rectangular frame) surrounding the contact pad arrays in FIGS. 1B and 1C is the beginning (interior border) of the area which is "without" the contact pad array (CPA). The importance of distinguishing between areas within and without the contact pad array (CPA) will become evident when describing connection bridges (CBR), below.

FIG. 2A shows a transponder chip module (TCM) comprising contact pads (CP) disposed on one side (or surface; top, as viewed) of a module tape (MT, or substrate) and a planar antenna (PA, or module antenna MA) and an RFID chip (CM, IC) disposed on the opposite side (or surface; bottom, as viewed) of the module tape (MT). The planar antenna (PA) is disposed around the RFID chip (CM, IC). The planar antenna (PA) has two ends—an inner end disposed interior to the planar antenna (PA) (towards the RFID chip), and an outer end disposed exterior to the planar antenna (PA). The inner end of the planar antenna (PA) may be connected directly (or via interconnect traces on the face-down side of the module tape (MT)) to a terminal (such as "LA") of the RFID chip (IC, CM). However, the other, outer end of the planar antenna (PA) must "cross over" the planar antenna (PA) in order to be connected with a second terminal (such as "LB") the RFID chip (IC, CM). This can be done with interconnect traces on the face down (bottom, as viewed) side of the module tape (MT). Alternatively, as will be seen in subsequent figures the outer end of the planar antenna (PA) structure may connected, through the module tape (MT) to an outer end of a connection bridge (CBR) disposed on the face up (top, as viewed) side of the module tape (MT), the connection bridge (CBR) can extend to a position corresponding to the interior of the planar antenna (PA) structure, and a connection can be made from the inner end of the connection bridge (CBR), through the module tape (MT) to a second terminal of the RFID chip (IC, CM).

In contrast with the planar antenna (PA), which may have one end oriented towards its interior and one end oriented towards its exterior, a wire wound module antenna (MA, or antenna structure AS) may have (i) both of its ends oriented towards the interior of the antenna structure (AS), (ii) one end oriented towards the interior and one end oriented towards the exterior of the antenna structure (AS), or (iii) both of its ends oriented towards the exterior of the antenna structure (AS). If both ends of an antenna structure (AS) are oriented towards the exterior of the antenna structure (AS), two connection bridges may be required to effect connections to the RFID chip (CM, IC).

FIG. 2B shows an antenna module (AM) or transponder chip module (TCM) 200 having a contact pad array (CPA) 202 comprising of 8 contact pads (C1-C8). The transponder chip module (TCM) also has two connection bridges (CBR-1, CBR-2) 210, 212 on its contact (face-up) side of the module tape (MT, not shown). An RFID chip (CM, IC, not shown) and a module antenna (MA, shown in dashed lines) may be disposed on the face-down side (not visible) of the module tape (MT). A border is shown around the transponder chip module (TCM), which may represent an opening (WO) in a card body (CB, or inlay substrate) for the transponder chip module (TCM).

The connection bridges (CBR-1, CBR-2) and contact pads (C1-C8) may be formed from a common conductive layer or foil of copper (for example), such as on a single-sided module tape (MT) which may have a conductive layer (or foil) on its face-up side having a thickness of 35 μm. The module tape (MT) may also be double-sided, having conductive layers (foils) on both its face-up and face-down sides. Having two connection bridges (CBR-1, CBR-2) may be useful in circumstances (i) when there are two module antennas (MA-1, MA-2), or (ii) when there is a single module antenna (MA) with a center-tap, or (iii) when there is a single module antenna (MA) with both of its ends oriented outward.

The module antenna (MA) may be a planar antenna (PA) which may be an etched (chemical or laser) antenna structure (AS). Alternatively, the module antenna (MA) may be a non-planar, wire-wound antenna structure (AS). FIG. 3 shows an example of a module antenna (MA) comprising wire wound on a dam structure (DS).

The connection bridge (CBR-1) 210 is shown disposed above the C1 contact pad, is generally "L-shaped", and extends from an outer position (indicated by a round dot "●") which is without (external to) the contact pad array (CPA) and without (external to) the module antenna (MA) to an inner position (indicated by an "X") which is within (internal to) the contact pad array (CPA) and within (internal to) the module antenna (MA). Connections of components on the underside (face down side) of the module tape (MT) may be made to the connection bridge (CBR-1) to achieve interconnects (such as illustrated in FIG. 2A) which may otherwise require troublesome cross-overs or additional interconnect layers. Notably, in this illustration, an outer end of the module antenna (MA) on the underside of the module tape (MT) may be connected to the outer position ("●") of the connection bridge CBR-1, and a terminal of the RFID chip (not shown, see FIG. 2A) may be connected to the inner position ("X") of the connection bridge CBR-1.

The second connection bridge (CBR-2) 212 is shown disposed above the C5 contact pad, and may be substantially a mirror image of the connection bridge (CBR-1), may be used to effect other or additional connections (not shown or described), and will not be described further. Having two connection bridges is optional. In cases where only one connection bridge is needed, the connection bridge (CBR-2) may suffice. Either or both of the connection bridges (CBR-1, CBR-2) may be positioned below the contact pad array (CPA) rather than above it.

In the illustration of FIG. 2B, the bottom contact pads C4 and C8 (otherwise, the bottom contact pads C3 and C7, for a 6 pad array) may be shaped to resemble the connection bridges pads (CBR-1, CBR-2), for aesthetic purposes. Also, as shown herein, the contact pads C2 and C6 may be "T-shaped", and the neighboring contact pads C1/C3 and C5/C7 may have cutouts to accommodate the top of the "T", as shown, also for aesthetic purpose.

Some additional characteristics of the L-shaped connection bridge (CBR-1 or CBR-2) may include at least one of the following (described mainly with respect to CBR-1, but applicable to CBR-2 as may be evident from the context):

the connection bridge may have an area which may be at least a significant fraction of, including substantially equal to, including greater than, that of a contact pad. For example, the contact pad C1 may measure approximately 4 mm (in the insertion direction)×3 mm (perpendicular to the insertion direction).

The L-shaped connection bridge may have a first portion which is external to the contact pad array (CPA), such as extending horizontally (as viewed) above the C1 pad and parallel to the insertion direction, measuring approximately 4 mm (in the insertion direction)×2 mm (perpendicular to the insertion direction), and is "elongated" (longer than it is wide).

The L-shaped connection bridge may have a second portion, which is generally perpendicular to the insertion direction, such as extending vertically (as viewed) next to the C1 pad, and extending from an end of the first portion to within the contact pad array, measuring approximately 2 mm (in the insertion direction)×4 mm (perpendicular to the insertion direction), and is "elongated" (longer than it is wide).

In FIG. 2B, there is a vertical dashed line in the connection bridge (CBR-1) 210. To the left of the line is the first portion 210a (parallel to the insertion direction) of the connection bridge, to the right of the line is the second portion 210b (perpendicular to the insertion direction) of the connection bridge.

Based on these examples, the total area of the contact pad C1 may be approximately 12 mm$^2$, and the total area of the connection bridge may be approximately 16 mm$^2$, or 33% greater than the area of a typical contact pad (the C5 contact pad is considered atypical, for this discussion, and whatever portion of the C5 contact pad extends upward beyond the C1 contact pad, for example, is defined herein to NOT be in the contact pad array 202). It may be noted, from the dimensions set forth in FIG. 1A, that a typical contact pad such as C1 may have an size of only 2 mm (12.25 mm-10.25 mm)×1.7 mm (20.93 mm-19.23 mm), resulting in an area of 3.4 mm$^2$, in which case the exemplary connection bridge may have an area which is nearly 5 times greater than that of the minimum-size contact pad (C1). Based on these numbers, the surface area (or footprint) of a connection bridge (CBR) may be at least a significant fraction, such as at least 25%, including at least 33%, including at least 50%, of the surface area of any of the "normal" contact pads (excluding the C5 contact pad, which is typically integral with, or includes, metallization in the central area of the contact pad array (CPA)), including substantially equal to (approximately the same size as), approximately 33% greater than, approximately 50% greater than, twice as large as, and larger, up to 5 times as large as, or greater than, the area of a normal contact pad. As shown in FIG. 6B, a connection bridge (CBR) which doubles as a coupling frame (CF) may have a surface area which is much much (>>) greater than the surface area of a normal contact pad (CP).

A connecting bridge (CBR) that has an area which is at least 50% of the surface area of 3.4 mm$^2$ (a minimal size for a contact pad) would have an area of at least 1.7 mm$^2$. Infineon's contact bridge may measure 0.5 mm (the connecting structure has a width in a range from approximately 50 μm to approximately 500 μm)×3 mm (estimated, see Infineon FIG. 4B), resulting in a maximum area of 1.5 mm$^2$. However, it is readily apparent that the connection bridge (CBR) in FIG. 2B has an area which is at least a substantial fraction of, such as at least 25%, including at least 33%, including at least 50% of the size of at least some of the other contact pads (excluding C5) in the associated contact pad array (CPA) of the transponder chip module (TCM). It can be observed from looking at Infineon's illustrations that their contact bridge is much smaller in area than their contact pads (which they refer to as "contact arrays")

on their contact pad array (which they refer to as "contact pad arrangement"), and that the connection bridge (CBR) disclosed herein is much larger in area than Infineon's contact bridge.

The connection bridges disclosed herein may all have a greater area than Infineon's contact bridge. In the example of FIG. 2B, the connection bridges (CBR-1, CBR-2) not only have an area substantially the same as some of the contact pads (CP), they actually resemble some of the contact pads (C4, C8).

The second portion of the L-shaped connection bridge enters the area of the contact pad array perpendicular to the insertion direction, between the C1 and C5 contact pads. An alternative would be entering between the C4 and C8 contact pads (or C3 and C7 contact pads for a 6-pad array). Because the second portion of the connection bridge has a substantial dimension (such as at least 1 mm) perpendicular to the insertion direction, it may be more robust than the Infineon contact bridge which has a very small dimension (50 μm-500 μm) perpendicular to the insertion direction. (Infineon: "the connecting structure has a width in a range from approximately 50 μm to approximately 500 μm.") The connection bridges disclosed herein may have a dimension perpendicular to the insertion direction greater than 0.5 mm, including greater than 1.0 mm, greater than 2.0 mm and greater than 3.0 mm.

Some Examples of Connection Bridges (CBR)

FIG. 3 illustrates, generically and generally, the concept of providing a connection bridge (CBR) on the face-up (top, as viewed) side of the module tape (MT), for connecting (interconnecting) two components on the face-down (bottom, as viewed) side of the module tape (MT). The two components may be a module antenna (MA) and an RFID Chip (CM, IC). Metallization on one side (front; top, as viewed) of the module tape (MT) may be patterned to have contact pads (CP, one shown) and a connection bridge (CBR, one shown). For purposes of this discussion, the module tape (MT) may be single-sided tape having metallization on only one side thereof, as illustrated. The concepts presented herein may also be applicable to double-sided tapes having metallization on both sides thereof.

As mentioned above (with regard to FIG. 2A), a module antenna (MA) may have an outer end and an inner end, and the outer end may need to cross over the module antenna (MA) to connect with the RFID chip (CM, IC). The connection bridge (CBR) facilitates making this connection. For purposes of this discussion, only one end of the module antenna (MA), and connecting it with a component such as an RFID chip is described.

FIG. 3 shows a transponder chip module (TCM) 300. An RFID chip (CM, IC) component is provided on the face-down (bottom, as viewed) side of the module tape (MT). A module antenna (MA) component is also provided on the face-down side of the module tape (MT), on the same side of the module tape (MT) as the RFID chip (CM, IC).

The module antenna (MA) in this example comprises a wire having two ends (only one end a is shown) and may be wound on a dam structure (DS, or winding core WC). Generally, the two ends of the module antenna (MA) may need to be connected with corresponding two terminals "LA" and "LB" (only the "LA" terminal is shown in the figure) of the RFID chip (CM, IC). A module antenna (MA) wound on a dam structure is shown in FIGS. 3, 3A, 4, 4A-4F of U.S. Ser. No. 14/078,527 filed 13 Nov. 2013 (US 20140104133 published 17 Apr. 2014).

The dam structure (DS) may be located on the opposite side of the module tape (MT) from the connection bridge (CBR), and may be aligned under the connection bridge (CBR). The dam structure (DS) (or winding core WC) has an interior portion (to the right, as viewed) and an exterior portion (to the left, as viewed). The module antenna (MA) is wound on the exterior of the dam structure (DS). The RFID chip (CM, IC) is disposed on the module tape (MT) in the interior of the dam structure (DS). The illustrative end a of the module antenna (MA) extends external to the module antenna (MA). In the event that both of two ends (only one shown) of the module antenna (MA) extend external to the module antenna (MA), two connection bridges may be needed to make connections such as to terminals of the RFID chip.

The connection bridge (CBR) extends between a first position (dot, "●") above the a first position without (external to) the dam structure (DS) to a second position ("X") above a position within (internal to) the dam structure (DS). A first opening 20 may be provided through the module tape MT at the first position. A second opening 22 may be provided through the module tape MT at the second position.

The openings 20 and 22 through the module tape (MA) may be referred to as "blind holes" (or "blind vias"), and may have a diameter (or other cross-dimension) of approximately 300 μm-500 μm to facilitate wire bonding through the blind holes in the module tape (MT). (The connection bridges shown in FIG. 2B (e.g.) may be shaped to have portions (30, 32) with surface area sufficient to support/accommodate wire bonding.) When wire-bonding through the blind holes, is may be advantageous that the conductive layer (foil, cladding) of the contact pads (CP) and connection bridge (CBR) have a thickness of approximately 35 μm, to avoid dents (dimpling). Alternatively, one connection to the connection bridge (CBR) may be made using wire bonding, and another connection to the connection bridge (CBR) may be made using plated-through holes (in the manner of Infineon, which uses two plated-through holes).

A first portion 30 of the connection bridge (CBR) is disposed over the first opening 20 A second end portion 32 of the connection bridge (CBR) is disposed over the second opening 22.

A first end a of the module antenna (MA) may be wire-bonded, through the first opening 20 to the underside of the first portion 30 of the connection bridge (CBR), and that a first terminal LA of the RFID chip (CM, IC) may be wire-bonded, through the second opening 22 to the underside of the second portion 32 of the connection bridge (CBR).

The connection bridge (CBR) provides a conductive path which extends from a position which is exterior to the dam structure (DS) to a position which is interior to the dam structure DS. This facilitates connecting a component (such as the module antenna MA) which is disposed external to the dam structure (DS) to a component (such as the RFID chip CM) which is disposed internal to the dam structure (DS). The connection bridge CBR serves as an interconnect between an end of the module antenna (MA) component and a terminal of the RFID chip (CM, IC) component. The module antenna (MA) and RFID chip (CM, IC) may only be shown generally, or not at all, in some subsequent figures (e.g., FIGS. 3A-3F, 5A,B), attention being concentrated in those figures on the connection bridge(s) themselves.

At least one of the contact pads (CP) may be modified to function as one or more connection bridges (CBR), effecting corresponding one or more (including two or more connections) between components on the other, opposite (back) side of the module tape (MT), such as the module antenna (MA) component and the RFID chip (CM, IC) component. FIG. 3A shows an example of the contact pad C6 having been modified to support two connection bridges (CBR-1, CBR-2). Viewed from a different perspective, in FIG. 3A, one connection bridge (CBR-1) is between contact pads C5 and C6, the other connection bridge (CBR-2) is between contact pads C6 and C7. (Infineon shows a contact bridge between C6 and C7, but does not show two connection bridges involving C6.)

As described in some of the following examples, the connection bridges (CBR) may be formed in various manners, including but not limited to:
 (FIG. 3A) as a part (or portion) of a given contact pad (C6)
 (FIG. 3B, 3C) having a portion disposed external to (along an outer edge of) the contact pad array (CPA), and extending around a corner of the contact pad array (CPA)
 (FIG. 3B, 3C, 3D) having a portion extending between two adjacent contact pads (CP)

FIG. 3A illustrates a transponder chip module 300A comprising two connection bridges (CBR-1, CBR-2) 310A and 312A formed in what otherwise may have been a contact pad, such as C6 (unassigned, not used, see FIG. 1A). A dam structure (DS) disposed on the opposite side of the module tape (MT) is shown in dashed lines. An RFID chip (CM, IC) disposed on the opposite side of the module tape (MT) is shown in dashed lines.

The connection bridges (CBR-1, CBR-2) may be formed as tracks, such as two sinusoidal tracks, which may be chemically-etched or laser-etched out of (otherwise) contact pad C6, with both tracks running along each side of the original contact pad C6. Alternatively, the tracks could run parallel, right and left, with the original contact pad remaining in the center. It may be noted that both connection bridges CBR-1 and CBR-2 are elongated, and extend substantially parallel to the insertion direction (from right to left, as viewed, see arrow), each in a manner similar to that of US 20130146670 (Infineon). Having two connection bridges (CBR-1, CBR-2) may be advantageous if both ends of a module antenna (MA) need to cross over the module antenna (MA) to connect with an RFID chip (CM, IC) disposed interior to the module antenna (MA). Infineon does not show or suggest having two connection bridges.

The contact pad C6 of a single-sided chip carrier tape could, in theory, be modified to create the two connection bridges (CBR-1, CBR-2) for connecting the wire ends of a module antenna (MA) to the terminals (LA, LB) of the RFID chip (CM, IC). However, modifying the C6 contact pad (or C4, or C8, which are also unassigned, see FIG. 1A) may not be compatible with some legacy contact terminals. There is a chance the card could be inserted into a non-standard or old design reader that applies a voltage across those contact pads and damages the chip. However, it is still possible to put contact bridges above and below these currently unused contact pads (C4, C6, C8), as shown in FIG. 3A.

The connection bridges (CBR-1, CBR-2) may be "dog bone" shaped, having wider areas at their two ends for covering the blind holes (see FIG. 3; 20, 22) through the module tape (MT). There may be a gap between the connection bridge (area) and the remainder of the contact pad (CP) to electrically isolate the connection bridge from the contact pad (CP).

The two connection bridges (CBR-1, CBR-2) may both be disposed in the C6 contact area, and may be formed so as to leave a portion, such as a middle portion of the contact pad C6 intact. Alternatively, the two connection bridges (CBR-1, CBR-2) may subsume (use up) all of the contact pad C6, leaving nothing behind. The connection bridges extend (exclusively) parallel to the insertion direction may be extended (such as to the right, as viewed) beyond the contact pad array (CPA) to without (external to) the contact pad array (CPA).

It may be noted that the C6 contact pad, which is not used, may be used for connection bridges, or eliminated entirely, or replaced with ferrite. However, if it were removed entirely, this may adversely affect the aesthetics of the module, and may also visibly expose the RFID chip (CM, IC) and connections behind the module tape (MT). The C6 contact pad may also be used for placement of a logo.

The wire ends of a module antenna (MA), or two module antennas (MA-1, MA-2), or two ends of a single module antenna (MA) can be connected to the interconnection bridges (CBR-1, CBR-2) by means of a solder process, laser welding, TC bonding, inner lead bonding or using conductive glue. This is indicated by dots (●). Alternatively, nanoparticles or nanowires with a low melting temperature could be used to facilitate the physical interconnection between the insulated copper wires of the module antenna(s) and the underside metallization layer. To avoid dents (dimples) appearing on the face-up side of the contact pads during bonding of the wire ends of the module antenna (MA) to the reverse side, the chip carrier tape (or module tape MT) can be partially heated and supported by a ceramic plate. To reduce the spacing between each bridge and the original contact pad, in this instance C6, the separation line can be laser etched. Connections to the RFID chip (CM, IC), disposed internal to the dam structure (DS) are indicated by (X's). Each connection bridge is shown with a dot (●) at an external end portion thereof, and an "X" at an internal end portion thereof.

FIG. 3B illustrates a transponder chip module 300B comprising a connection bridge (CBR) 310B extending from without (external to) the contact pad array (CPA) to within (internal to) the contact pad array (CPA). More particularly,
 a first portion of the connection bridge (CBR) is disposed above the contact pads C1 and C5 and extends parallel to the insertion direction. A first end of the connection bridge (CBR) may be connected (dot "●") to an end (MA-1) of the module antenna (MA) (not shown) disposed on the opposite side of the module tape (MT).
 the connection bridge (CBR) then extends around a corner of the contact pad array (CPA), here shown extending around the contact pad C5,
 a second portion of the connection bridge (CBR) extends perpendicular to the insertion direction, external to the contact pad pattern (to the right of C5, as viewed),
 a third portion of the connection bridge (CBR) extends parallel to the insertion direction and heads inward, into the contact pad array (CPA), between adjacent contact pads (C5 and C6, as viewed) so as to be above a position ("X") where it may be connected with a terminal (LA) of the RFID chip (CM, IC)

As with some other of the embodiments disclosed herein, the connection bridge (CBR) has at least one elongated portion (first and third, in this example) extending longitudinally parallel to the insertion direction, and at least one other elongated portion (second, in this example) extending longitudinally perpendicular to the insertion direction. In this regard, if an identifiable elongated portion of a connection bridge is elongated (the connection bridge in FIG. 3B has three such portions), the direction of an elongated portion may be determined by its longitudinal extent. As used herein, "elongated" portion may refer to a portion of the connection bridge that is long and narrow, or longer than it is wide. The Infineon contact bridge has only one identifiable elongated portion, and it extends parallel to the insertion direction.

The portion of the connection bridge (CBR) heading inward between contact pads C5 and C6 may be formed from the contact pad C6, as described above with respect to FIG. 3A.

It may be noted that the connection bridge (CBR) is elongated, having a top portion which extends substantially parallel to the insertion direction (from right to left, as viewed, see arrow), a middle portion which extends substantially perpendicular to the insertion direction (from top to bottom, as viewed), and a bottom portion which extends substantially parallel to the insertion direction.

The connection bridge (CBR) effects a connection between a first position (dot "●"), external to the contact pad array (CPA), above the top left of the contact pad array (CPA), which may be connected to an end of a module antenna (MA-1), to a second position ("X") on the right side of the contact pad array (CPA), internal to the contact pad array (CPA), which may be connected with the RFID chip (CM, IC). This enables an end of the module antenna (MA) which is external to the dam structure (DS) to be connected to the RFID chip (CM, IC), for example.

FIG. 3C illustrates a transponder chip module 300C comprising a connection bridge (CBR-1) 310C similar to the connection bridge (CBR) shown in FIG. 3B. However, in this embodiment, the top (as viewed) portion of the connection bridge (CBR-1) extending over contact pads C1 and C5 is "fat" (wide, perpendicular to the insertion direction), and can support a logo ("LOGO"). A second connection bridge (CBR-2) 312C is shown extending from below the contact pads C3 and C7, around the side of the contact pad array (CPA) to C6, where a portion of the connection bridge (CBR-2) extends between C6 and C7 into the interior of the contact pad array (CPA), and may be a "mirror image" of the connection bridge (CBR-1). More particularly, The first connection bridge (CBR-1) is elongated, having a top portion which extends substantially parallel to the insertion direction, extends around a corner of the contact pad array (CPA), a middle portion which extends substantially perpendicular to the insertion direction, and a bottom portion which extends substantially parallel to the insertion direction.

The second connection bridge (CBR-2) is elongated, having a bottom portion which extends substantially parallel to the insertion direction, a middle portion which extends substantially perpendicular to the insertion direction, and a top portion which extends substantially parallel to the insertion direction.

The top portion of the first connection bridge (CBR-1) and the bottom portion of the second connection bridge (CBR-2) can both support logos, or other design elements.

FIG. 3D illustrates a transponder chip module 300D comprising another configuration of connection bridges (CBR-1, CBR-2) 310D, 312D. Contact pads C1, C2, C3 and C5, C6, C7 are shown, for an exemplary 6 pad contact pad array (CPA). In this example, the connection bridge (CBR-1) is disposed entirely within the area (footprint) of the contact pad array (CPA). The connection bridge (CBR-2) is similar to the connection bridge (CBR-2) shown in FIG. 3A. More particularly, The first connection bridge (CBR-1) is shown extending adjacent the C1, C2 and C3 contact pads, interior to the contact pad array (CPA) in a direction perpendicular to the insertion direction, then extending parallel to the insertion direction along the bottom of the C5 contact pad, then extending upward (as viewed) in a direction perpendicular to the insertion direction and adjacent to the C7 and C6 contact pads. The connection bridge (CBR-1) then extends between C5 and C6 parallel to the insertion direction and terminates at the right hand side of the contact pad array (CPA), within the contact pad array (CPA). All of this has been within the footprint of the contact pad array (CPA). However, this last portion (between C5 and C6) of the connection bridge (CBR-1) could be extended beyond (to the right of, as viewed) the contact pad array (CPA), to without (external to) the contact pad array (CPA). This embodiment illustrates that a large proportion of the central area of the contact pad array (CPA), typically contiguous with the C5 contact pad (CP), can be used for the connection bridge (CBR-1).

T second connection bridge (CBR-2) is shown extending parallel to the insertion direction between C6 and C7 contact pads. The connection bridge (CBR-2) is similar to the connection bridge (CBR-2) shown in FIG. 3A.

Also shown as open circles ("o") representing potential hole positions in the module tape (MT) that can be used to make electrical connections to the RFID chip (CM, IC) or antenna module (MA) via wire bonds or other methods. (Dots and X's are not used in this example.)

FIG. 3E illustrates a transponder chip module 300E comprising a first connection bridge (CBR-1) 310E disposed entirely without (external to) the contact pad array (CPA), and a second connection bridge (CBR-2) 312E disposed entirely within (internal to) the contact pad array (CPA), and also illustrates that the RFID chip (CM, IC) may be rotated (turned slightly, such as approximately 30°) to facilitate wire bond connections to its contact pad(s). Wire bonding is limited to a particular maximum loop length. The rotation of the RFID chip (CM, IC) can shorten the distance from a given chip bond pad to module tape connection pad. More particularly (with respect to the connection bridges, The first connection bridge (CBR-1) extends above (as viewed in the figure) the contact pads C1 and C5 around a corner of the contact pad array (CPA), and to the right (as viewed) of contact pads C5, C6, C7. The first connection bridge (CBR-1) may provide a connection between a pad (not shown, on the underside of the module tape MT) within the dam structure (DS), for antenna connection (LA) on the RFID chip (CM, IC) and a pad (not shown, also on the underside of the module tape MT) for a first end of the module antenna (MA, not shown). The connection bridge (CBR-1) is shown extending 90° around the exterior of the contact pad array (CPA), but could continue around the next corner to extend 180° around the contact pad array (CPA). The connection bridge (CBR-1) extends from without the contact pad array (CPA) to within the contact pad array (CPA).

The second connection bridge (CBR-2) may be formed at the bottom (as viewed in the figure) of (or as a bottom portion of) the contact pad C5. The second connection bridge (CBR-2) may provide a connection between a pad (not shown, on the underside of the module tape MT) within the dam structure (DS), for antenna connection (LB) on the RFID chip (CM, IC) and a pad (not shown, also on the underside of the module tape MT)

for a second end of the module antenna (MA, not shown). The connection bridge (CBR-2) extends only within the footprint (or area) of the contact pad array (CPA) to within the contact pad array (CPA).

FIGS. 3, 3A, 3B, 3C, 3D, 3E have shown various embodiments of contact pad (face-up) sides of a module tape (MT), such as a single-sided tape (but could also be a double-sided tape) wherein the foil for the contact pads (CP) has been etched (or otherwise processed) to have one or more electrical connection bridges (CBR). The figures have shown relevant portions of a module tape (MT) with an RFID chip (CM, IC) mounted on the underside (back, face-down side) and contact pads (CP) disposed on the top (front, face-up) side. A module antenna (MA) may be wire wound on a dam structure (DS, or winding core WC). The two wire ends of the module antenna (MA) may be connected through "blind hole" openings in the module tape (MT) to the back side(s) of one or more connection bridges (CBR). The relevant terminals (LA, LB) of the RFID chip (CM, IC) may also be connected to the connection bridges (CBR).

FIG. 3F illustrates a transponder chip module 300F and shows a contact pad area (array) of an antenna module (AM) situated in an elliptical punched out area ("punching area") of a module tape (MT) and areas of conductive foil located outside of (external to) the contact pads (CP) and patterned as connection bridges (CBR), or for logo/branding.

A contact pad array area (contact pads omitted from the view) or area is disposed in a rectangular punch out area 320 of a layer of a module tape (MT), details (individual contact pads) omitted. Remaining foil on the contact side of the module tape MT may be patterned to have one or more connection bridges (CBR). The remaining foil may be in an elliptical area surrounding the contact pad area.

Four areas of conductive foil (or cladding) 310F, 312F, 314F, 316F, on the contact side of the module tape (MT), outside of the ISO 7816-2 area for contact pads are shown. The two areas (shaded) 310F and 312F, shown at the top and bottom of the contact pad array area, and labeled "connection bridge", may serve as connection bridges (CBR) external to the contact pad array (CPA), in a manner similar to the contact bridge (CBR-1) in FIG. 3E, and are both disposed entirely without (external to) the contact pad array (CPA). The two areas (shaded) 314F and 316F, shown to the left and right of the contact pad array area are labeled "logo/branding", and are also disposed entirely without (external to) the contact pad array (CPA). The areas labeled "connection bridge" may have logo/branding. The areas labeled "logo/branding" may function as connection bridges (CBR).

A module antenna (MA, not shown) and an RFID chip (CM, IC, not shown) may be located on the other side ("chip side") of the module tape, and may be interconnected to positions, shown as dark dots, with one another by connections (such as blind vias or plated-through holes) to the underside of one or more of the connection bridges (or logo/branding areas). These connections (two shown) may be entirely outside of the contact pad array area.

The Contact Bridges of US 20130146670

US 20130146670 (2013; Grieshofer; "Infineon") discloses a chip card contact array arrangement, comprising: a carrier; a plurality of contact arrays which are arranged on a first side of the carrier; an electrically conductive structure which is arranged on a second side of the carrier, which is arranged opposite the first side of the carrier; a first plated-through hole and a second plated-through hole; wherein the first plated-through hole is coupled to the electrically conductive structure; a connecting structure which is arranged on the first side of the carrier, wherein the connecting structure connects the first plated-through hole to the second plated-through hole; and the connecting structure having a longitudinal extent which runs parallel to a direction in which a contact-connection device on a reading device is moved relative to the plurality of contacts.

FIG. 4 (corresponding with FIG. 3 of Infineon) shows a cross-sectional view of a chip card module, and is discussed in further detail hereinbelow. Generally, the chip card module 300 has a carrier 302 which has a front 316 and back 318. The back 318 holds the turns 306 of the coil, which are arranged concentrically around a region which contains the chip 304. The contact bridge 312 arranged on the front 316 runs from an outer region of the front 316 of the chip card module 300 toward the center or toward an inner region 316 of the chip card module 300. The inner region of the front 316 may be arranged essentially above the region on the back 318 of the chip card module 300 which contains the chip 304. The outer turn 306 of the coil is electrically connected to one end of the contact bridge 312 by means of the first bushing 306. The other end of the contact bridge 312 is connected to the chip 304 by means of the second bushing 310. In addition, a contact array 314 is visible on the front 316 of the chip card contact array arrangement 300.

FIG. 4A (corresponding with FIG. 4B of Infineon) shows an embodiment of a contact array arrangement 420 which may be arranged on the front of the back of the chip card contact array arrangement 400. The contact array arrangement 420 has six separate contact arrays 410, the connection and arrangement thereof being able to be based on ISO/IEC standard 7816-2. The contact bridge 412 is arranged between the second end of the first bushing 404 and the second end of the second bushing 414 and is electrically connected to these. In addition, the contact bridge 412 may be arranged in the direction of sliding, i.e. in the direction which may correspond to the direction in which the chip card, which may hold the chip card contact array arrangement, is pushed or inserted into a reading device. In FIG. 4B, the circumstance described would correspond to a relative movement, which takes place vertically in FIG. 4B. As a result, it is possible to prevent the contact bridge 412 from undergoing mechanical wear along its small dimension, that is to say its width, when the chip card is pushed into a reading device, which can have a positive effect on the life of the contact bridge 412 and hence the operability of the chip card contact array arrangement. In addition, border structures 416 are arranged around the contact arrays 410, some of which are respectively connected to one of the adjoining contact arrays 410.

FIG. 4B (corresponding with FIG. 4C of Infineon) shows the back of the chip card contact array arrangement. The superimposed view clearly reveals that the contact bridge 412 arranged on the front of the chip card module is used in order, in interaction with the first bushing 404 and the second bushing 414, to provide an electrically conductive connection between the end of the outer turn of the turns 402 of the coil and the region 406 which contains the chip (not shown in the figures).

Coupling Frame

As mentioned in U.S. Ser. No. 14/465,815 filed 21 Aug. 2014, a smartcard (SC) may comprise an electrically-conductive layer, referred to herein as a "coupling frame" (CF) disposed in the card body (CB) around at least two sides (or 180°) of a transponder chip module (TCM) so as to be in close proximity with the module antenna (MA) in the transponder chip module (TCM). The coupling frame (CF) may nearly completely surround the transponder chip module (TCM), such as all four sides (or 360°) thereof, minus a slit (S). The slit (S) may be very small, such as 50 μm. A coupling frame (CF), at least partially surrounding a transponder chip module (TCM) and residing substantially on the same plane as the laser-etched antenna structure (LES) in a card body, document or tag, without creating a closed circuit around the transponder chip module (TCM) by leaving at least one space or gap as an open circuit such as a cut-out, slit or slot in the coupling frame (CF), may increase the amplitude of the resonance curve of the transponder chip module (TCM) with minimal frequency shift when interrogated by a reader, and may increase the activation distance.

A coupling frame (CF) may be incorporated into an antenna module (AM) or transponder chip module (TCM), and may be formed from the same conductive layers as the contact pads (CP) on one (face-up, contact) side of the chip carrier tape (CCT).

The coupling frame (CF) may be in the form of a ring (such as a rectangular ring) which may be disposed closely adjacent to and partially surrounding a planar antenna (PA) structure of a transponder chip module (TCM). The coupling frame (CF) ring may have an inner edge and an outer edge. Both of the inner and outer edges may have the same geometric form (shape), such as rectangular. The inner edge may have a geometric form (such as rectangular) corresponding to the geometric form of the planar antenna (PA) structure, and an outer edge with another geometric form (such as round or elliptical). The coupling frame (CF) may be surround at least two sides of the planar antenna (PA) structure, such as three sides thereof, or all four sides. In the case of the coupling frame (CF) surrounding substantially the entire planar antenna (PA) structure, a slit (or slot, or gap) may be provided, extending from the inner edge to the outer edge of the coupling frame (CF) so that it is an open-loop conductor, having two ends and a gap therebetween. When the term "partially surrounding" is used herein, it generally may refer to such a coupling frame (CF) which substantially surrounds (except for the slit, slot or gap) the planar antenna (PA) structure.

FIG. 5A shows an antenna module (AM) or transponder chip module (TCM) 500A having an array of contact pads (C1-C8) and two connection bridges (CBR-1, CBR-2). The contact pads (CP) and connection bridges (CBR) may be disposed on one side (face-up side) of a module tape (MT) or chip carrier tape (CCT) of the Transponder Chip Module (TCM). The transponder chip module (TCM) itself corresponds generally to the transponder chip module (TCM) shown in FIG. 2B, but a coupling frame (CF) has been added.

The module tape (MT, CCT) may comprise epoxy-glass, 35 mm wide. Some dimensions for the transponder chip module (TCM) and coupling frame (CF) are shown.

A planar antenna (PA) 502A may be provided on an opposite (face-down) side of the module tape (MT) or chip carrier tape (CCT) of the Transponder Chip Module (TCM), and is shown only generally in dashed lines. This corresponds generally to the transponder chip module (TCM) shown in FIG. 2B. The planar antenna (PA) may be laser-etched. Alternatively, the planar antenna (PA) may be chemically etched. Only a few turns (or tracks) of the planar antenna (PA) are shown, for illustrative clarity. There may be 10-12 turns, depending on the input capacitance of the RFID chip. The outer turn of the planar antenna (PA) may extend nearly to the periphery of the contact pad array (although it is disposed on the opposite side of the module tape (MT) or chip carrier tape (CCT) from the contact pad array (CPA)).

A coupling frame (CF) 520A may be disposed on module tape (MT) or chip carrier tape (CCT), and is shown surrounding the contact pads (CP) and connection bridges (CBR) 510A, 512A. In this example, the coupling frame (CF) is disposed on the same side of the module tape (MT) or chip carrier tape (CCT) as the contact pads (CP) and connection bridges (CBR), and may be formed from the same metal layer (e.g., 18 μm or 35 μm thick copper) that forms the contact pads (CP) and connection bridges (CBR). The coupling frame (CF) may have a narrow slit (S) 522A which may measure approximately 50 μm, or smaller, such as 25 μm or 10 μm.

The planar antenna (PA) and connection traces (not shown) to the bond pads (BP), may be formed from a metal layer (e.g., 18 μm or 35 μm thick copper) with a thickness similar to the metal layer that forms the contact pads (CP) and connection bridges (CBR).

The coupling frame (CF) may be substantially coplanar with the planar antenna (PA), and may overlap at least some outer turns of the planar antenna (PA).

The outer periphery of the contact pad array (CPA) is shown as being rectangular. An inner edge of the coupling frame (CF) is shown as being rectangular. A gap 524A separates the inner edge of the coupling frame (CF) from the outer periphery of the contact pad array (CPA). The gap may be approximately 100 μm, or less. An outer edge of the coupling frame (CF) may also be rectangular. Some exemplary dimensions (approximate) may be:

- contact pad array (CPA), 10.6 mm×8.0 mm (for a 6 pad array)
    - area of contact pad array (CPA), approximately 85 mm$^2$
- area of the planar antenna (PA) structure, somewhat less than that of the CPA
- inner edge of coupling frame, 10.7 mm×8.1 mm
    - opening in the coupling frame (CF) for the contact pad array (CPA), 87 mm$^2$
- outer edge of coupling frame, 26 mm×28 mm (728 mm$^2$)
    - area of coupling frame (CF), 728 mm$^2$-87 mm$^2$=641 mm$^2$ In this example, the coupling frame (CF) has an area which is approximately 7 times larger than the area of the planar antenna (PA) structure. For an 8 pad array, this ratio may be less.

A slit (or slot, or gap) (S) extends from the inner edge of the coupling frame (CF) to the outer edge thereof, so that the coupling frame (CF) is an open-loop element. The coupling frame (CF) extends around the contact pad array (CPA), including around the connection bridges (CBR).

The slit (S) in FIG. 5A is shown extending from an inside edge of the coupling frame (CF) to the outside edge thereof, at a position to the left of the transponder chip module (TCM). The slit (S) makes the coupling frame (CF) an open loop. It should be understood that the slit (S) may be located elsewhere, such above the transponder chip module (TCM), to the right of the transponder chip module (TCM), or below the transponder chip module (TCM).

For electrostatic discharge (ESD) protection, the coupling frame (CF) may be connected with (linked to, contiguous with) the C5 contact pad which is ground (earth).

The coupling frame may be separate from the transponder chip module, per se. Alternatively, the coupling frame may be disposed on the front surface of the module tape, along with the contact pads, and may be considered to be a part of a larger form factor transponder chip module. In either case, connections may be made to the coupling frame to connect components (such as IC chip, module antenna) disposed on the back surface of the module tape. This FIG. 5A may be comparable to FIG. 11 of the aforementioned U.S. Ser. No. 14/492,113 (U.S. Ser. No. 97/98,968), incorporated by reference herein.

FIG. 5B illustrates a transponder chip module 500B having a coupling frame (CF) 520B, such as (similar to the one) shown in FIG. 5A, similar elements are similarly numbered (suffix "B" rather than "A"). The coupling frame 520B extends around the contact pad array, including around the connection bridges 510B, 512B, with a gap 524B therebetween, and has a slit (S) 522B making it an open loop. A planar antenna (PA) 502B is shown, generally.

The coupling frame 520B may be extended to the interior of the contact pad array (CPA), on the top (as viewed) of the contact pad array (CPA) between the C1 and C5 contact pads, and may serve as a connection bridge (CBR) 510B effecting a connection between a first position (indicated by the dot "●") which is without (external to) the contact pad array (CPA) and a second position (indicated by the "X") which is within (internal to) the contact pad array (CPA). Or, in other words, a connection bridge (CBR) may be enlarged to nearly encircle the transponder chip module (TCM) to serve "double duty" as a coupling frame (CF). The coupling frame (CF) may be considered to be integral with the connection bridge (CBR), and vice-versa (a connection bridge may be extended around the contact pad array to serve as a coupling frame). The resulting "hybrid" connection bridge (CBR)/coupling frame (CF) may have a surface area much much (>>) greater than the surface area of a normal contact pad (CP).

The coupling frame (CF) may be somewhat effective if it extends around at least two (of the four) sides of the contact pad array (CPA), may be more effective if it extends around at least three sides of the contact pad array (CPA), and may be most effective if it extends around nearly all four sides of the contact pad array (CPA), as shown. In this example, the coupling frame is formed in the same layer as the connection bridge, on the same side of the module tape, and extends substantially all around the contact pad array (except for the slit). A coupling frame may be disposed on an opposite side of the module tape and connected in any suitable manner with the connection bridge, if desired. When the connection bridge is connected with an end of a module antenna, the connection bridge (including, in some embodiments, the hybrid connection bridge/coupling frame) may functions as a capacitive extension of the module antenna. The coupling frame/connection bridge may be patterned with holes, slits and the like.

Distinguishing Over US 20130146670 ("Infineon")

The connecting structures or contact bridges disclosed in US 20130146670 ("Infineon") are generally long and narrow, are oriented (arranged) in the direction of sliding, and make a connection between two plated-through holes.

The Infineon contact bridge is necessarily narrow (it has a small dimension, that is to say its width) so that may be arranged centrally in a free space between two contact pads (which Infineon refers to as "contact arrays"), for example between pads C6 and C7. From ISO 7816 it is evident that there is a maximum space available of only approximately 1.7 mm (26.01 mm-24.31 mm) for Infineon's contact bridge. Hence, the Infineon contact bridge (connecting structure) has a width in a range from approximately 50 µm to approximately 500 µm, which is very narrow, and admittedly fragile.

Because it is so narrow, the Infineon contact bridge is arranged in the direction of sliding, i.e. in the direction which may correspond to the direction in which the chip card, which may hold the chip card contact array arrangement, is pushed or inserted into a reading device. As a result, it is possible to prevent the contact bridge from undergoing mechanical wear along its small dimension, that is to say its width, when the chip card is pushed into a reading device.

Some of the connection bridges (CBR) disclosed herein (for example, the L-shaped connection bridge in FIG. 2B) are what may be termed "fat", having a dimension perpendicular to the direction of insertion which is comparable to the dimension (perpendicular to the direction of insertion) of the contact pads (CP). Ergo, the connection bridges (CBR) ought to be as capable as the contact pads (CP) of resisting mechanical wear. The overall area of the connection bridge is also comparable to (or larger than the area of a typical contact pad. A "fat" connection bridge having at least a portion with a large area facilitates wire bonding to the underside of the connection bridge (CBR)—referred to herein as "blind hole" bonding—which would not be possible with Infineon's "skinny" connecting structure or contact bridge. In other words, at least a portion of the connection bridge is large enough in area to accommodate wire bonding, such as 0.4 mm×0.4 mm, or larger. Moreover, in contrast with Infineon, the connection bridges disclosed herein are capable of effecting (supporting) interconnections between components on the other side of the module tape without requiring plated-through holes.

It is believed that the Infineon's connecting structure or contact bridge may be formed from a relatively thin foil (conductive layer, typically copper, on the substrate) having a thickness of approximately 9 µm, which contributes to its delicate nature. The connection bridges (CBR) and contact pads (CP) disclosed herein may be formed from a relatively thick foil (conductive layer, typically copper, on the substrate) having a thickness of approximately 35 µm, which contributes to its mechanically durable nature, enabling such things as blind hole bonding (without deforming the foil).

A connection bridge (CBR, disclosed herein) or contact bridge (Infineon) may have two ends, and may generally be arranged to extend from one end external to (without) the boundaries of the contact pad array (CPA; C1-C8 for 8 pad arrays, or C1-C3 and C4-C7 for 6 pad arrays) to another end which is within the boundaries of the contact pad array (CPA).

In contrast with the Infineon contact bridges, the connection bridges (CBR) disclosed herein need not be long and narrow to fit between two narrowly-spaced contact pads such as C6 and C7. Rather, the connection bridge (CBR, see FIG. 2B, for example) enters the contact pad array between two widely-spaced contact pads such as C1 and C5, which facilitates having two connection bridges (CBR-1, CBR-2).

Some advantages of having "fat" connection bridges (CBR) rather than "skinny" contact bridges (Infineon) may include, but are not limited to:
  the connection bridges (CBR) may serve as an ornamental feature of the contact pad array (CPA)
  logos may be disposed on the connection bridges (CBR)
  the additional metal of the connection bridges (CBR) around the contact pad array (CPA) may be used to tune or improve the performance of the transponder chip module (TCM)

Some additional contrasts may be drawn between at least some of the connection bridge(s) disclosed herein and Infineon's contact bridges, among which are that:
  the module tape MT disclosed herein may be a single-sided tape. Infineon's tape (302) is double-sided tape, using an etched module antenna (306)

Infineon relies upon plated-through holes (which they also refer to as "bushings") to effect connections between one side of the carrier (module tape) and the other side the module antenna MA disclosed herein may be a wire-wound coil having two wire ends. The ends may be wire-bonded directly to the backside (underside) of the connection bridges (or contact pads) through holes extending through the module tape MT (see FIG. 3). No plated-through holes or bushings are required, and the module tape MT may be a single-sided tape.

if the module antenna MA is wire-wound, the winding core WC (e.g.) of the module antenna MA may additionally function as a dam for encapsulating the chip CM and its connections. The chip CM may be flip-chip mounted or wire bonded, and some of the chip's contacts may be wire bonded to the undersides of the appropriate contact pads.

Infineon's contact bridge is arranged centrally in a free space between two contact arrays. The connection bridges (CBR) disclosed herein may have various other alignments, including extending around the exterior of the contact pad array (CPA) and subsuming significant portions of a given contact pad (CP), such as (but not limited to C6). The connection bridges (CBR) disclosed herein may also (alternatively or additionally) extend through the central area of the contact pad array typically used by the C5 contact pad.

the contact bridges CBR disclosed herein may extend other than parallel to the insertion direction, including having significant portions extending substantially perpendicular to the insertion direction. These perpendicular portions may be relatively thick, and robust, to resist "mechanical wear . . . when the chip card (Infineon's terminology) is pushed into a reading device". Infineon discusses "the connecting structure having a longitudinal extent which runs parallel to a direction in which a contact-connection device on a reading device is moved relative to the plurality of contacts" (Abstract) Also, "This can minimize the risk of appropriate contacts on the reading device sliding over the contact bridge 506 transversely with respect to the longitudinal extent thereof and causing material removal at right angles to the longitudinal extent of the contact bridge 506, that is to say along the width, which may be in the form of the more delicate dimension." (paragraph [0045]).

In summary, the connection bridges disclosed herein are more robust and versatile than Infineon's contact bridges.

While the invention(s) has/have been described with respect to a limited number of embodiments, these should not be construed as limitations on the scope of the invention (s), but rather as examples of some of the embodiments. Those skilled in the art may envision other possible variations, modifications, and implementations that are also within the scope of the invention(s), and claims, based on the disclosure(s) set forth herein.

What is claimed is:

1. Transponder chip module (TCM) comprising:
a substrate (MT, CCT) having a first surface and a second surface;
a contact pad array (CPA) disposed on the first surface of the substrate;
a coupling frame (CF) disposed on the first surface of the substrate, at least partially surrounding the contact pad array; and
components comprising a chip and an antenna disposed on the second surface of the substrate, said components requiring connection with one another;
wherein the coupling frame serves as a connection bridge (CBR) for interconnecting the components disposed on the second surface of the substrate.

2. The transponder chip module of claim 1, wherein:
the coupling frame extends to an interior of the contact pad array (CPA).

3. The transponder chip module of claim 1, wherein:
the coupling frame extends between two contact pads of the contact pad array.

4. The transponder chip module of claim 1, wherein:
an insertion direction is defined for the transponder chip module;
a first portion of the connection bridge is external to the contact pad array and extends parallel to the insertion direction; and
a second portion of the connection bridge extends perpendicular to the insertion direction to within the contact pad array.

5. The transponder chip module of claim 1, wherein:
at least a portion of the connection bridge has an area large enough to support wire bonding.

6. The transponder chip module of claim 1, wherein:
the connection bridge can effect interconnections without requiring plated-through holes.

7. The transponder chip module of claim 1, wherein:
the connection bridge is large enough to support a logo.

8. The transponder chip module of claim 1, wherein:
the connection bridge is large enough to accommodate wire bonding.

9. The transponder chip module of claim 1, wherein:
the connection bridge is disposed entirely external to the contact pad array.

10. The transponder chip module of claim 1, wherein:
the connection bridge is disposed at least partially internal to the contact pad array.

11. The transponder chip module of claim 1, further comprising:
a second connection bridge disposed on the first surface of the substrate.

12. The transponder chip module of claim 11, wherein:
an insertion direction is defined for the transponder chip module; and
both connection bridges extend parallel to the insertion direction.

13. A smart card comprising the transponder chip module of claim 1.

14. Method of connecting components disposed on a bottom surface of a substrate for a transponder chip module (TCM), the transponder chip module having a contact pad array on a front surface thereof, the method comprising:
providing a coupling frame on the front surface of the substrate, wherein the coupling frame at least partially surrounds the contact pad array; and
connecting the components through the substrate, via the coupling frame, to one another.

15. The method of claim 14, wherein:
a portion of the coupling frame extends between contacts of the contact pad array.

16. The method of claim 14, further comprising:
incorporating the transponder chip module into a smart card.

* * * * *